US012809201B2

(12) United States Patent
Hong et al.

(10) Patent No.: US 12,809,201 B2
(45) Date of Patent: Nov. 24, 2026

(54) DISPLAY DEVICE

(71) Applicant: SAMSUNG ELECTRONICS CO., LTD., Gyeonggi-do (KR)

(72) Inventors: Daegun Hong, Suwon-si (KR); Byoungjung Kim, Suwon-si (KR); Sungdo Jo, Suwon-si (KR); Byeonghwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 18/962,291

(22) Filed: Nov. 27, 2024

(65) Prior Publication Data

US 2025/0093692 A1 Mar. 20, 2025

Related U.S. Application Data

(63) Continuation of application No. 18/444,332, filed on Feb. 16, 2024, now Pat. No. 12,259,610, which is a (Continued)

(30) Foreign Application Priority Data

Nov. 11, 2021 (KR) ........................ 10-2021-0154659

(51) Int. Cl.
*G02F 1/1333* (2006.01)

(52) U.S. Cl.
CPC .... *G02F 1/13332* (2021.01); *G02F 1/133325* (2021.01)

(58) Field of Classification Search
CPC ........... G02F 1/13332; G02F 1/133325; G02F 1/133328; G02F 2201/46; G06F 1/1601; H04N 5/64; H04N 5/645; G09F 9/30
See application file for complete search history.

(56) References Cited

U.S. PATENT DOCUMENTS 9,693,475 B2 6/2017 Tang et al.
9,709,215 B2 7/2017 Yoo et al.

(Continued)

FOREIGN PATENT DOCUMENTS

CN 201191389 Y 2/2009
JP 8-138272 A 5/1996

(Continued)

OTHER PUBLICATIONS

Communication dated Feb. 25, 2025, issued by the European Patent Office in European Application No. 24218196.4.

(Continued)

*Primary Examiner* — Charles S Chang
(74) *Attorney, Agent, or Firm* — Sughrue Mion, PLLC

(57) ABSTRACT

A display apparatus includes a display panel displaying an image; a top chassis provided along an outer periphery of the display panel and supporting the display panel, the top chassis including a magnet fastening portion therein; a chassis cover provided on an exterior of the top chassis and covering the top chassis; a magnet provided on the magnet fastening portion and configured to allow the chassis cover to be detachably mounted to the top chassis; and an elastic bracket configured to fasten the magnet to the magnet fastening portion, the elastic bracket may include a bracket body to which the magnet is mounted and an interference portion configured to interfere with the magnet fastening portion.

13 Claims, 16 Drawing Sheets

Related U.S. Application Data continuation of application No. PCT/KR2022/013960, filed on Sep. 19, 2022.

(56) References Cited

U.S. PATENT DOCUMENTS

| | | | | |
|---|---|---|---|---|
| 9,888,595 | B2 | 2/2018 | Min et al. | |
| 10,649,255 | B2 | 5/2020 | Kim et al. | |
| 10,750,624 | B2 | 8/2020 | Ann et al. | |
| 11,335,219 | B2 | 5/2022 | Kim | |
| 2006/0207145 | A1 | 9/2006 | Kim et al. | |
| 2015/0248036 | A1 | 9/2015 | Bu | |
| 2017/0139258 | A1 | 5/2017 | Jiang | |
| 2018/0039137 | A1* | 2/2018 | Yamakawa | G02B 6/0088 |
| 2018/0180929 | A1 | 6/2018 | Kim et al. | |
| 2020/0084896 | A1 | 3/2020 | Ann et al. | |

FOREIGN PATENT DOCUMENTS

| | | | |
|---|---|---|---|
| JP | 3100947 | B2 | 8/2000 |
| JP | 4607433 | B2 | 1/2011 |
| KR | 20-0400713 | Y1 | 11/2005 |
| KR | 10-2006-0038258 | A | 5/2006 |
| KR | 10 2006 0089014 | A | 8/2006 |
| KR | 10-2007-0057332 | A | 6/2007 |
| KR | 10-2010-0105258 | A | 9/2010 |
| KR | 20100105258 | A | 9/2010 |
| KR | 20-2011-0008724 | U | 9/2011 |
| KR | 10-2015-0102617 | A | 9/2015 |
| KR | 10-1602959 | B1 | 3/2016 |
| KR | 10-2016-0141478 | A | 12/2016 |
| KR | 10-2017-0014999 | A | 2/2017 |
| KR | 10 2018 0068433 | A | 6/2018 |
| KR | 10-1936987 | B1 | 1/2019 |
| KR | 10-2018-0074491 | A | 7/2019 |
| KR | 10-2020-0075549 | A | 6/2020 |
| KR | 10-2241809 | B1 | 4/2021 |
| KR | 10-2021-0083018 | A | 7/2021 |
| KR | 10-2023-0068650 | A | 5/2023 |
| WO | 2010105258 | A1 | 9/2010 |

OTHER PUBLICATIONS

Communication dated Apr. 9, 2026 issued by the Korean Ministry of Intellectual Property in Korean Patent Application No. 10-2021-0154659.

International Search Report (PCT/ISA210) issued Dec. 14, 2022 by the International Searching Authority in International Application No. PCT/KR2022/013960.

Written Opinion (PCT/ISA237) issued Dec. 14, 2022 by the International Searching Authority in International Application No. PCT/KR2022/013960.

Communication issued Oct. 22, 2024 by the European Patent Office in European Patent Application No. 22893008.7.

Communication dated Jan. 21, 2026, issued by European Patent Office in European Patent Application No. 24218196.4.

Communication dated Jul. 1, 2026 issued by the Korean Ministry of Intellectual Property in Korean Patent Application No. 10-2024-0183175.

Communication issued Sep. 21, 2026 by the European Patent Office in European Patent Application No. 24 218 196.4.

* cited by examiner

DISPLAY DEVICE

CROSS REFERENCE TO RELATED APPLICATIONS

This is a Continuation of U.S. application Ser. No. 18/444,332, filed on Feb. 16, 2024, which is a continuation of International Application No. PCT/KR2022/013960, filed on Sep. 19, 2022, which is based on and claims priority to Korean Patent Application No. 10-2021-0154659, filed on Nov. 11, 2021, in the Korean Intellectual Property Office, the disclosures of which are incorporated by reference herein in their entireties.

BACKGROUND

1. Field

The disclosure relates to a display apparatus, and more particularly, to a display apparatus capable of being fitted with a chassis cover.

2. Description of Related Art

Display devices visually display acquired or stored image information to a user, and are used in various applications, such as homes and businesses.

In recent years, the resolution and size of the display panels used to display content in the display devices has increased. In addition, the thickness of a case, including a top chassis and a bottom chassis that cover the display panel, is becoming thinner. In other words, the thickness of a bezel of the display devices is being reduced to increase a user's immersion in the image.

On the other hand, such a display device may include a chassis cover that is detachably attached to the case in order to cover a portion in which the bezel is located, and at the same time improve the design to satisfy the user's preference.

SUMMARY

Provided is a display apparatus having a chassis cover detachably mountable.

Further, provided is a display apparatus having an improved structure for easily attaching a magnet to a case.

According to an aspect of the disclosure, a display apparatus includes: a display panel displaying an image; a top chassis provided along an outer periphery of the display panel and supporting the display panel, the top chassis including a magnet fastening portion therein; a chassis cover provided on an exterior of the top chassis and covering the top chassis; a magnet provided on the magnet fastening portion and configured to allow the chassis cover to be detachably mounted to the top chassis; and an elastic bracket configured to fasten the magnet to the magnet fastening portion, the elastic bracket may include a bracket body to which the magnet is mounted and an interference portion configured to interfere with the magnet fastening portion.

The top chassis may further include a bezel supporting a front edge of the display panel and a top sidewall extending rearward from the bezel, and the magnet may be provided on an inner surface of the top sidewall.

The magnet fastening portion may include an interference groove into which the interference portion is inserted.

The interference portion may include an elastic material configured to be squeezed as the interference portion is inserted into the interference groove.

The magnet fastening portion may further include an interference guide forming the interference groove between the magnet fastening portion and an inner surface of the top chassis, and the interference portion may be guided by the interference guide in a state in which the interference portion is inserted into the interference groove.

The interference portion may include: a first contact portion contacting the interference guide; and a second contact portion extending from the first contact portion and contacting the inner surface of the top chassis.

The interference portion may further include a magnet support portion extending from the first contact portion and supporting one surface of the magnet.

The bracket body may be configured to cover at least a portion of an outer surface of the magnet and interfere with the magnet.

The bracket body may include an elastic material configured to bring the magnet into close contact with an inner surface of the top chassis.

The bracket body may include: a first cover portion covering the outer surface of the magnet located on an opposite side of the top chassis; and a second cover portion extending from the first cover portion and covering at least a portion of another outer surface of the magnet.

As the first cover portion approaches the second cover portion, the first cover portion may be inclined to approach an inner surface of the top chassis on which the magnet is seated.

The bracket body may have a size corresponding to a size of the magnet.

The elastic bracket may further include a fastening portion configured to be fastened to the magnet fastening portion.

The magnet fastening portion may include a fastening groove, and the fastening portion may be configured to be hook-coupled to the fastening groove.

The fastening portion may further include a first fastening portion and a second fastening portion, and the interference portion may be between the first fastening portion and the second fastening portion.

According to an aspect of the disclosure, a display apparatus includes: a case including a top chassis, a bottom chassis, and a magnet fastening portion; a display panel accommodated in the case; a chassis cover provided on an exterior of the case and covering an outer periphery of the display panel; a magnet provided on the magnet fastening portion and configured to allow the chassis cover to be detachably mounted to the case, and an elastic bracket configured to fasten the magnet to the magnet fastening portion, the elastic bracket including a bracket body to which the magnet is mounted and an interference portion configured to interfere with the magnet fastening portion.

The chassis cover may include a support rib protruding to be supported on the case.

The magnet fastening portion may be provided on an inner surface of the top chassis.

The top chassis may include a bezel supporting a front edge of the display panel and a top sidewall extending rearward from the bezel, and the magnet may be provided on an inner surface of the top sidewall.

According to an aspect of the disclosure, a display apparatus includes: a display panel displaying an image; a top chassis disposed along an outer periphery of the display panel and supporting the display panel, the top chassis comprising a first magnet therein; a chassis cover configured to detachably mounted to an exterior of the top chassis, the chassis cover comprising a second magnet in which an attraction by magnetic force is formed between the first magnet and the second magnet; and an elastic bracket configured to interfere with an inner surface of the top chassis and bring the first magnet into contact with the inner surface of the top chassis.

According to one or more embodiments, the magnet is provided in the magnet fastening portion provided inside a case, so that the chassis cover can be detachably mounted to the outside of the case.

According to one or more embodiments, the elastic bracket is provided which interferes with the magnet fastening portion and the magnet, so that the magnet can be easily attached to the case.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
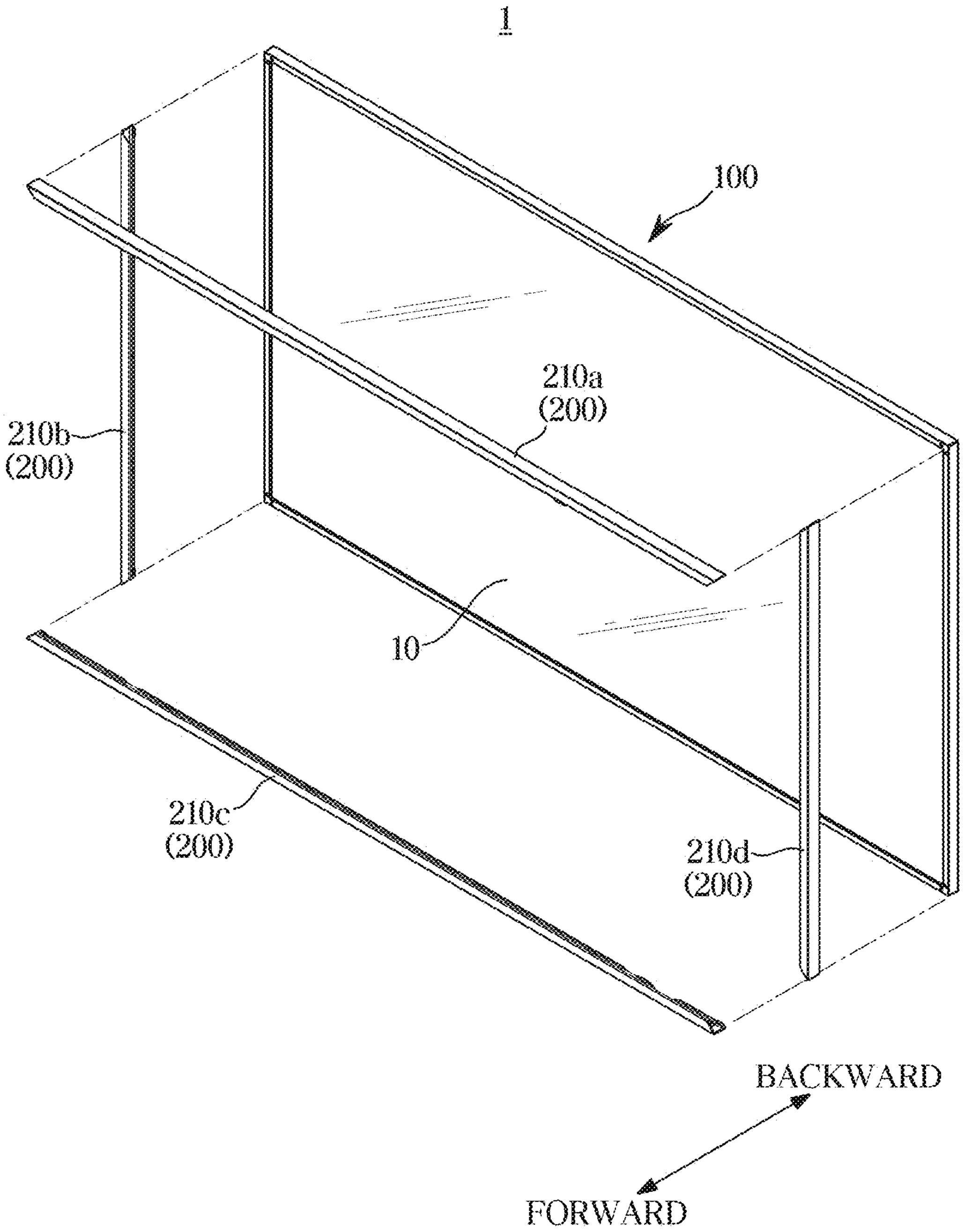
FIG. 1 is a perspective view showing a display apparatus according to one or more embodiments of the disclosure.

The embodiments described herein are example embodiments, and thus, the disclosure is not limited thereto and embodiments may include various modifications, equivalents, and/or alternatives.

In addition, the same reference numerals or signs shown in the drawings of the disclosure indicate elements or components performing substantially the same function. The singular form of a noun corresponding to an item may include one or a plurality of the items unless clearly indicated otherwise in a related context.

Also, the terms used herein are used to describe the embodiments and are not intended to limit or restrict the disclosure. The singular forms "a," "an" and "the" are intended to include the plural forms as well, unless the context clearly indicates otherwise. In this disclosure, the terms "including", "having", and the like are used to specify features, figures, steps, operations, elements, components, or combinations thereof, but do not preclude the presence or addition of one or more of the features, figures, steps, operations, elements, components, or combinations thereof.

It will be understood that, although the terms first, second, primary, secondary, etc., may be used herein to describe various elements, the various elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Further, as used in the disclosure, the terms "front", "rear", "top", "bottom", "side", "left", "right", "upper", "lower", and the like are defined with reference to the drawings, and are not intended to limit the shape and position of each component.

One or more embodiments of the present disclosure will be described in detail below with reference to the accompanying drawings.

Furthermore, while the following describes liquid crystal display (LCD) display devices, a type of display device, as an example for ease of description, configurations of the present disclosure are not limited to LCD display devices and may be applied to various types of display devices. For example, the configurations of the present disclosure may be applied to organic light emitting diodes (OLED) display devices that do not include a backlight unit (BLU). Alternatively, configurations of the present disclosure may be applied to micro LED display devices.

Figure 2:
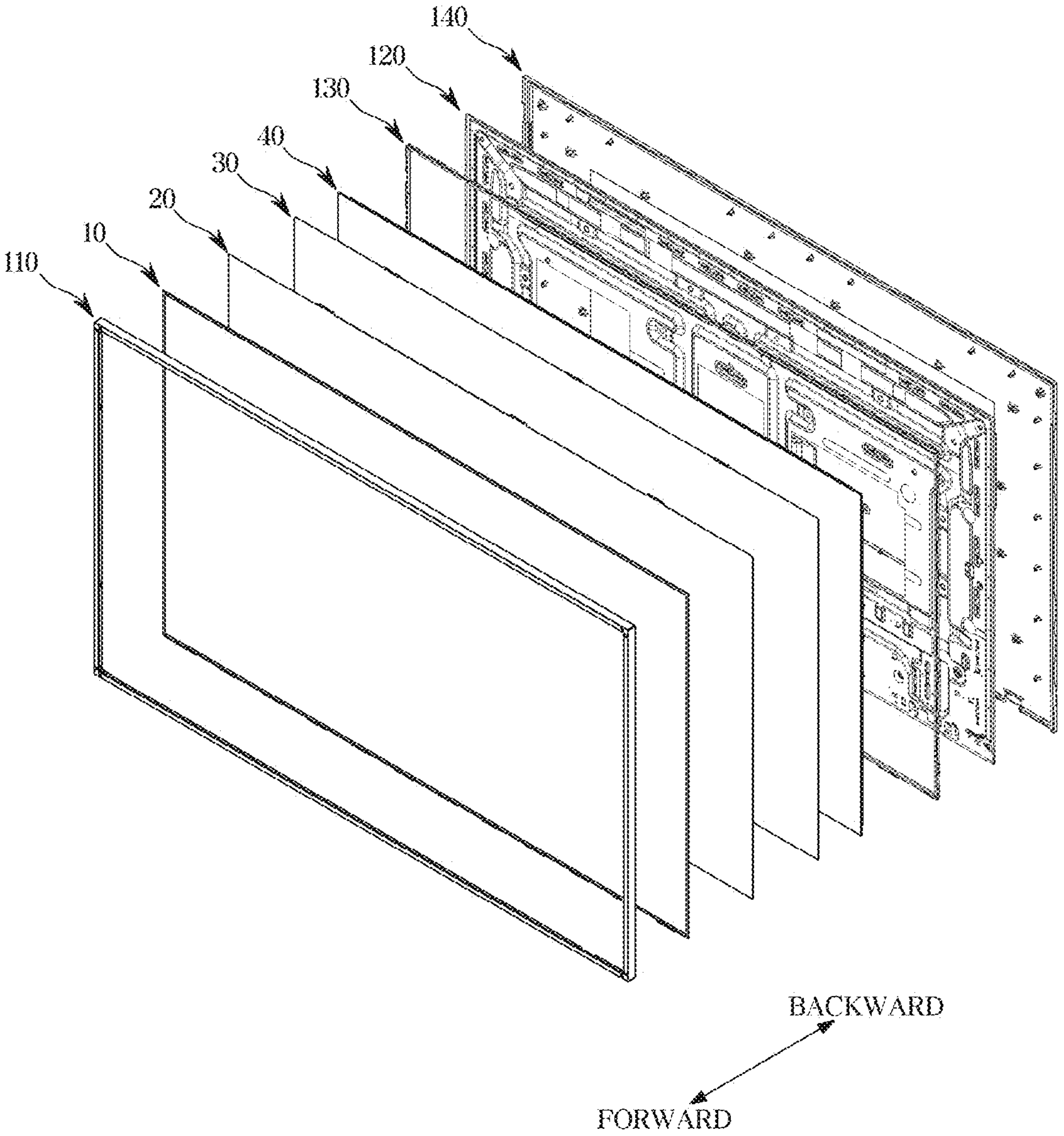
FIG. 2 is an exploded perspective view showing the display apparatus of FIG. 1 according to one or more embodiments of the disclosure.

FIG. 1 is a perspective view showing a display device according to one or more embodiments. FIG. 2 is an exploded perspective view showing the display device of FIG. 1.

Referring to FIG. 1 and FIG. 2, a display device (also referred to as a display apparatus) 1 is a device capable of processing an image signal received from an external source and visually displaying the processed image. In the following, an example of the display device 1 is a television (TV), but is not limited thereto. The display device 1 may be implemented in various forms, such as a monitor, a portable multimedia device, a portable communication device, and the like, and the form of the display device 1 is not limited as long as it is a device for visually displaying images.

The display device 1 may be a large format display (LFD) installed outdoors, such as on the roof of a building or at a bus stop. Here, the outdoors is not necessarily limited to an area outside, and the display device 1 according to one or more embodiments may be installed in any place where a large number of people can come and go, even if indoors, such as a subway station, shopping mall, movie theater, office, store, or the like.

The display device 1 may receive content including video signals and audio signals from various content sources, and output video and audio corresponding to the video signals and audio signals. The display device 1 may receive content data via a broadcast reception antenna or a wired cable, receive content data from a content playback device, or receive content data from a content delivery server of a content provider.

The display device 1 may include a display panel 10 that displays an image (including video), a backlight unit (BLU) disposed behind the display panel 10 to provide light to the display panel 10, a case 100 that supports the BLU and the display panel 10, and a chassis cover 200 that may be detachably mounted to the case 100. The display panel 10 shown in FIGS. 1 and 2 has a flat shape, but the display panel 10 may also have a curved shape.

The case 100 may form an exterior of the display device 1, and components for the display device 1 to display the image or perform various functions may be provided inside the case 100. The case 100 shown in FIGS. 1 and 2 has a flat plate shape, but the shape of the case 100 is not limited thereto. The case 100 may have a curved plate shape to correspond to the shape of the display panel 10.

The display device 1 may include the case 100 and a support device that rotatably supports the case 100. According to one or more embodiments, the case 100 and the support device may be formed integrally.

The case 100 may include a bottom chassis 120 provided to support the BLU, a top chassis 110 arranged at a front side of the bottom chassis 120 to support the display panel 10, and a middle mold 130 coupled between the top chassis 110 and the bottom chassis 120. The case 100 may further include a rear cover 140 coupled to a rear side of the bottom chassis 120 to cover the rear of the display device 1. The case 100 may accommodate or support display panel 10.

The display panel 10 may include a thin film transistor substrate in which thin film transistors are formed in the form of a matrix, a color filter substrate that is coupled in parallel with the thin film transistor substrate, and a liquid crystal that is injected between the thin film transistor substrate and the color filter substrate and allows its optical properties to be varied depending on changes in voltage or temperature. The display panel 10 may block or pass light emitted from the BLU, that is, the display panel 10 may be a LCD panel. According to one or more embodiments, the display panel 10 may also be an OLED panel or a micro LED panel.

On one side of the display panel 10, a cable that transmits image data to the display panel 10 and a display driver integrated circuit (DDI) that processes digital image data and outputs an analog image signal may be provided.

The BLU may be disposed at the rear of the display panel 10 to direct light toward the display panel 10. The BLU may include a light source device including a light source module and a printed circuit board (PCB) on which the light source module is mounted, and optical members disposed in a travel path of light emitted from the light source module. A plurality of light source devices may be provided to be spaced apart from each other.

The optical members may be disposed along the travel path of light emitted from the light source module to guide the progress of light, reflect light, diffuse light, or enhance light properties.

The optical members may include a light guide plate 40 provided to diffuse light emitted from the BLU, an optical sheet 30 disposed in front of the light guide plate 40, and a light diffusion sheet 20 provided to diffuse the light.

The BLU may emit light to a lateral side of the light guide plate 40. The PCB and one side of the light guide plate 40 may be arranged to face each other. Likewise, the light source module and the one side of the light guide plate 40 may be arranged to face each other. Light emitted from the light source module may be incident on the light guide plate 40 through the one side of the light guide plate 40, and light incident on the light guide plate 40 may be emitted through a front surface of the light guide plate 40. Upon passing through the light guide plate 40, spot light emitted from the light source module may be changed into plane light.

The optical sheet 30 may be provided to cover the front surface of the light guide plate 40. The optical sheet 30 may be disposed between the light guide plates 40 of the middle mold 130. The optical sheet 30 may be provided to improve the characteristics of light emitted from the light guide plate 40.

The light diffusion sheet 20, which is disposed at the rear of the display panel 10 to cover the display panel 10 and the rear surface of the display panel 10, may be arranged between the top chassis 110 and the middle mold 130. The light diffusion sheet 20 may be configured to diffuse light, and may have a thickness less than that of the light guide plate 40.

The bottom chassis 120 may be disposed at the rear of the BLU. The bottom chassis 120 may have a substantially plate shape with a forwardly bent edge. The BLU may be accommodated between the bottom chassis 120 and the top chassis 110.

The bottom chassis 120 may function to dissipate heat generated by a heating element, such as the light source module, to the outside. The bottom chassis 120 may comprise various metal materials, such as aluminum, Steel Use Stainless (SUS), or plastic materials, such as Acrylonitrile Butadiene Styrene (ABS).

The top chassis 110 may have a frame shape with an opening to allow light from the BLU to be provided to the display panel 10.

The middle mold 130 may be coupled between the top chassis 110 and the bottom chassis 120. The middle mold 130 may be formed in a frame shape with an opening.

Figure 3:
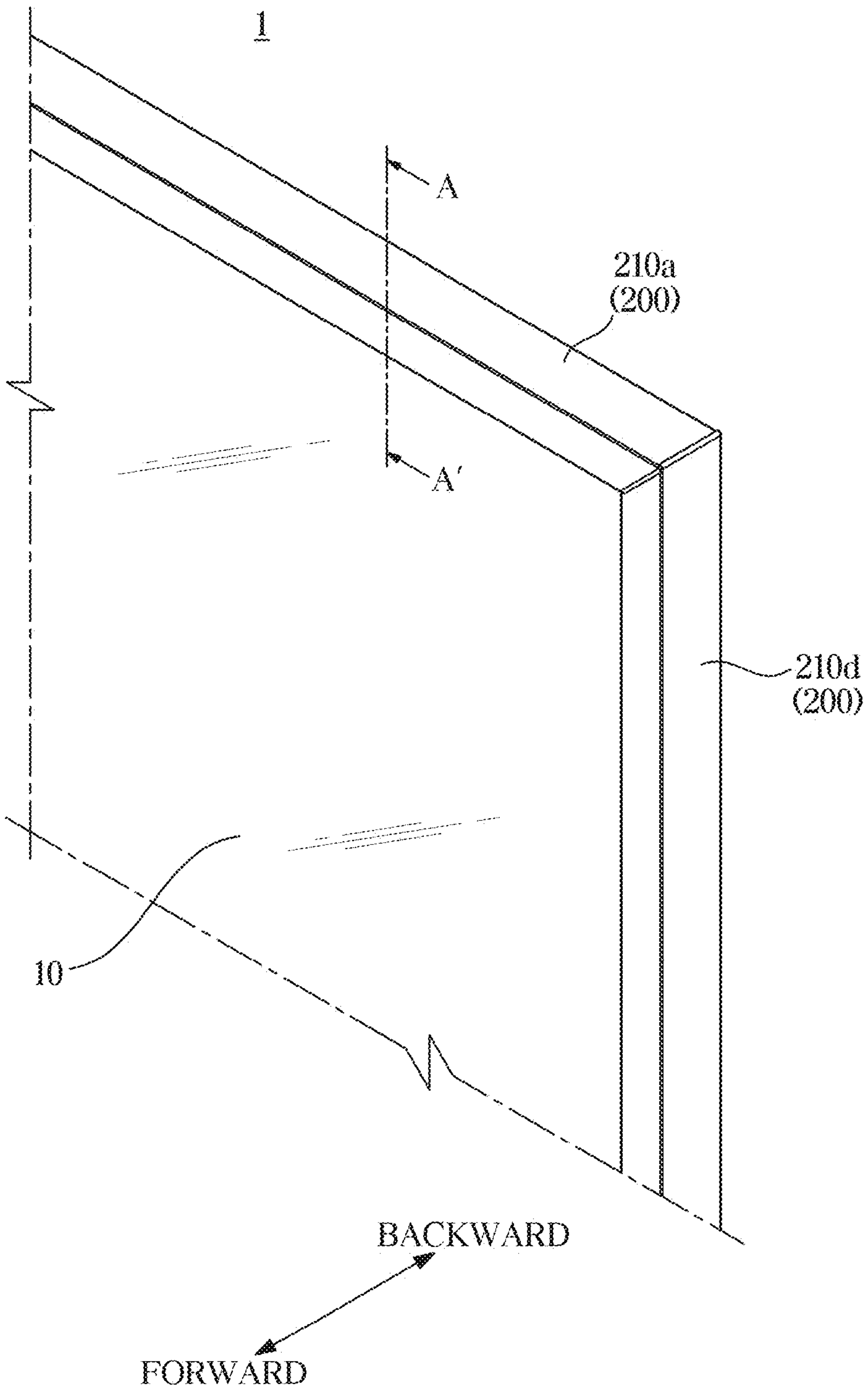
FIG. 3 is an enlarged view showing a chassis cover of FIG. 1 coupled to a case from the front according to one or more embodiments of the disclosure.
Figure 4:
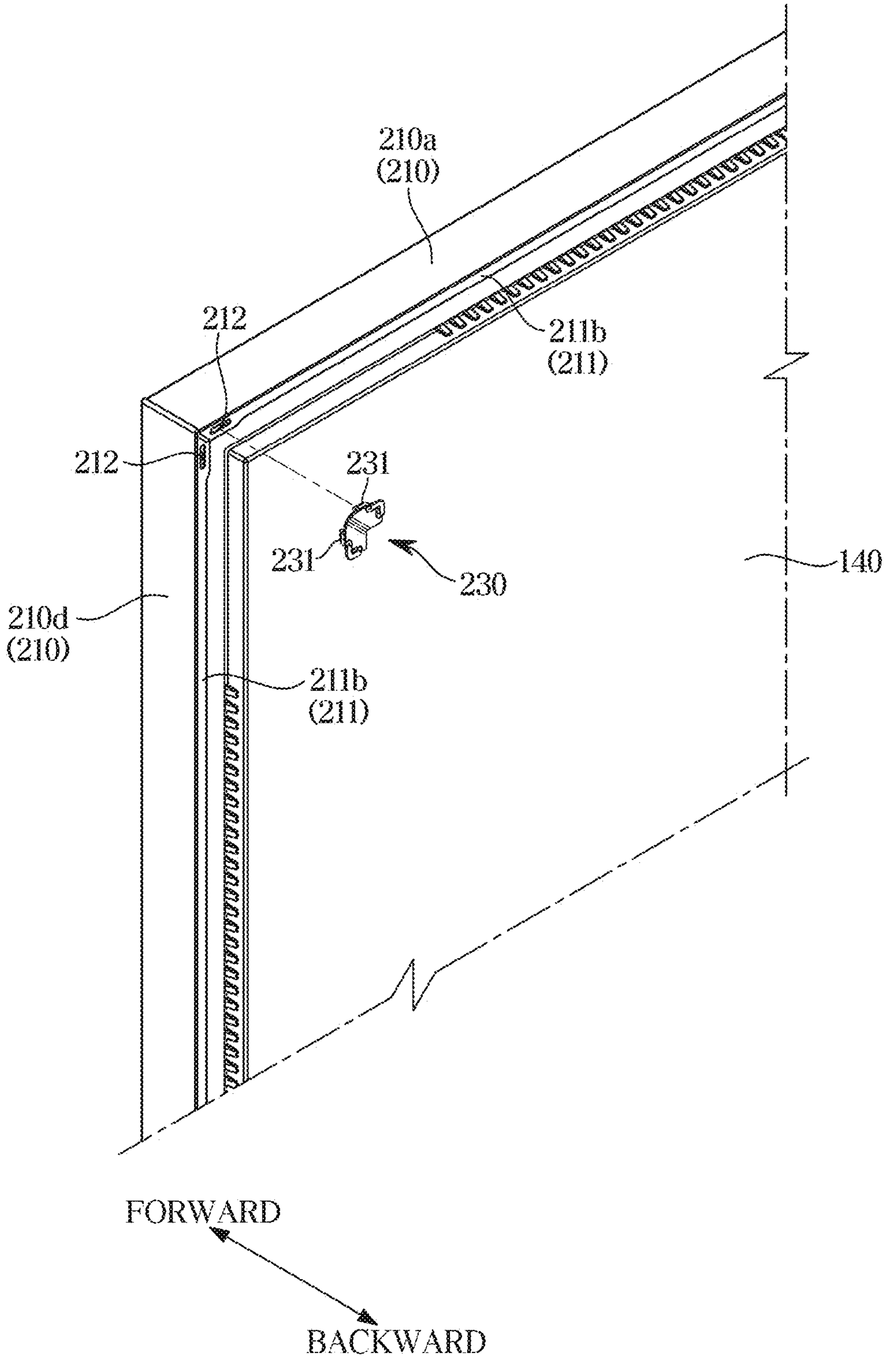
FIG. 4 is an enlarged view showing the chassis cover of FIG. 1 coupled to the case from the rear according to one or more embodiments of the disclosure.
Figure 5:
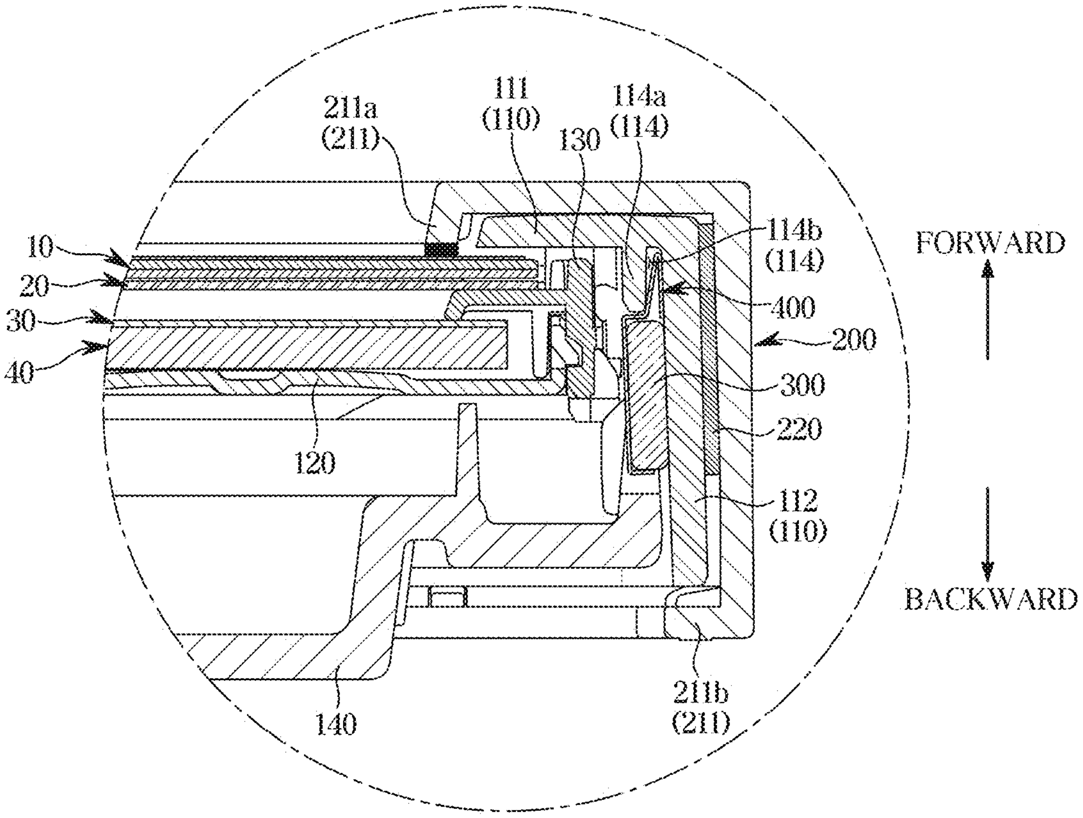
FIG. 5 is a cross-sectional view taken along line A-A' in FIG. 3 according to one or more embodiments of the disclosure.

FIG. 3 is an enlarged view illustrating the chassis cover of FIG. 1 coupled to the case as seen from the front. FIG. 4 is an enlarged view illustrating the chassis cover of FIG. 1 coupled to the case as seen from the rear. FIG. 5 is a cross-sectional view taken along line A-A' in FIG. 3.

Referring to FIGS. 3, 4, and 5, the display device 1 may include the chassis cover 200 that is detachably mounted on the outside of the case 100. The chassis cover 200 may be mounted on the outside of the case 100 to cover an outer periphery of the case 100.

The chassis cover 200 may be mounted to the outside of the top chassis 110 to cover the top chassis 110. The top chassis 110 may include a bezel 111 supporting a front edge of the display panel 10 and a top sidewall 112 extending rearward from the bezel 111, wherein the chassis cover 200 may be provided to cover the bezel 111 and the top sidewall 112. Accordingly, the chassis cover 200 may decorate an appearance of the display device 1. However, the present disclosure is not limited thereto, and according to one or more embodiments, the chassis cover 200 may be mounted to the outside of the case 100 to cover various surfaces of the case 100. The chassis cover 200 may be provided to cover the outside of the bottom chassis 120 or the rear cover 140.

The chassis cover 200 may include a cover body 210 forming a body thereof. The cover body 210 may be configured to include a plastic material. The cover body 210 may be injection-molded from a plastic material. However, the present disclosure is not limited thereto, and according to one or more embodiments, the cover body 210 may include various materials. The cover body 210 may be formed of a metal material.

The cover body 210 may include four cover bodies 210*a*, 210*b*, 210*c*, and 210*d* (see FIG. 1). The four cover bodies 210*a*, 210*b*, 210*c*, and 210*d* may each be detachably mounted on one of the four sides of the top chassis 110. Accordingly, the four cover bodies 210*a*, 210*b*, 210*c*, and 210*d* may be provided to cover one of the four sides of the top chassis 110, respectively. Accordingly, a user may easily attach or detach the plurality of cover bodies 210*a*, 210*b*, 210*c*, and 210*d*, respectively, from the case 100. However, the present disclosure is not limited thereto, and according to one or more embodiments, the chassis cover 200 may include a varying number of cover bodies 210. The cover bodies 210 may be provided with two, three, or five or more. According to one or more embodiments, the cover bodies 210 may be provided in a single and form a single unit.

The plurality of cover bodies 210 may each include a chassis cover coupling groove 212 such that they are releasably coupled to each other when mounted to the case 100. Each of the chassis cover coupling grooves 212 may be provided at an end of each cover body 210, and the cover bodies 210 mounted adjacent to each other may be arranged such that the chassis cover coupling grooves 212 formed on the adjacent ends are adjacent to each other. The chassis cover 200 may include a chassis cover coupling member 230, and the chassis cover coupling member 230 may include a plurality of coupling protrusions 231 that may each be inserted into the chassis cover coupling grooves 212. The chassis cover coupling grooves 212 may be formed to be positioned at the rear of the case 100 when the chassis cover 200 is mounted to the case 100, and the chassis cover coupling member 230 may be coupled to the cover coupling groove 212 at the rear of the case 100 to mutually secure the plurality of cover bodies 210. Accordingly, the plurality of cover bodies 210 may be detachably coupled to each other without compromising the appearance of the display device 1 when viewed by a user from the front of the display device 1. However, the present disclosure is not limited thereto, and according to one or more embodiments, the plurality of cover bodies 210 may be coupled to each other in various ways. Alternatively, according to one or more embodiments, the plurality of cover bodies 210 may not be coupled to each other.

The chassis cover 200 may include a support rib 211 that protrudes inwardly to be supported on the case 100. The chassis cover 200 may include the support rib 211 on the cover body 210, so that the chassis cover may be easily supported on the case 100.

In a state in which the chassis cover 200 is mounted to the case 100, the support rib 211 may include a front support rib 211*a* that is located on a front side of the display device 1 and protrudes rearward to surround one end of the bezel 111. Alternatively, according to one or more embodiments, the support rib 211 may include a rear support rib 211*b* that is located on a rear side of the display device 1 and protrudes to surround a rear surface of the top sidewall 112 and a rear surface of the bottom chassis 120 or the rear cover 140. As a result, the chassis cover 200 may be stably mounted to the case 100. However, the present disclosure is not limited thereto, and according to one or more embodiments, the chassis cover 200 may have a variety of shapes as long as it may be detachably mounted to the case 100.

The chassis cover coupling grooves 212 described above may be provided on the rear support rib 211*b*.

The chassis cover 200 may include a metal sheet 220 positioned on the inside of the cover body 210. The chassis cover 200 may include the metal sheet 220 provided to form an attraction by magnetic force between the chassis cover 200 and a magnet 300, which will be described later. The magnet 300 may alternatively be referred to as a first magnet 300, and the metal sheet 220 may alternatively be referred to as a second magnet 220.

The metal sheet 220 may comprise a material, such as iron, nickel, or the like. However, the present disclosure is not limited thereto, and according to one or more embodiments, the metal sheet 220 may include a variety of materials as long as an attraction by magnetic force may be formed between the metal sheet 220 and the magnet 300. The metal sheet 220 may be a permanent magnet. As a result, the user may be able to easily attach or detach the chassis cover 200 to the case 100.

The metal sheet 220 may be attached to an inner surface of the cover body 210. The metal sheet 220 may be arranged on the inner surface of the cover body 210 to correspond to a position of the magnet 300 inside the case 100. The metal sheet 220 may be provided to correspond to the number of magnets 300. However, the present disclosure is not limited thereto, and according to one or more embodiments, the metal sheets 220 may be provided in various numbers. The metal sheets 220 may be provided integrally on the inner surface of the cover body 210.

Figure 6:
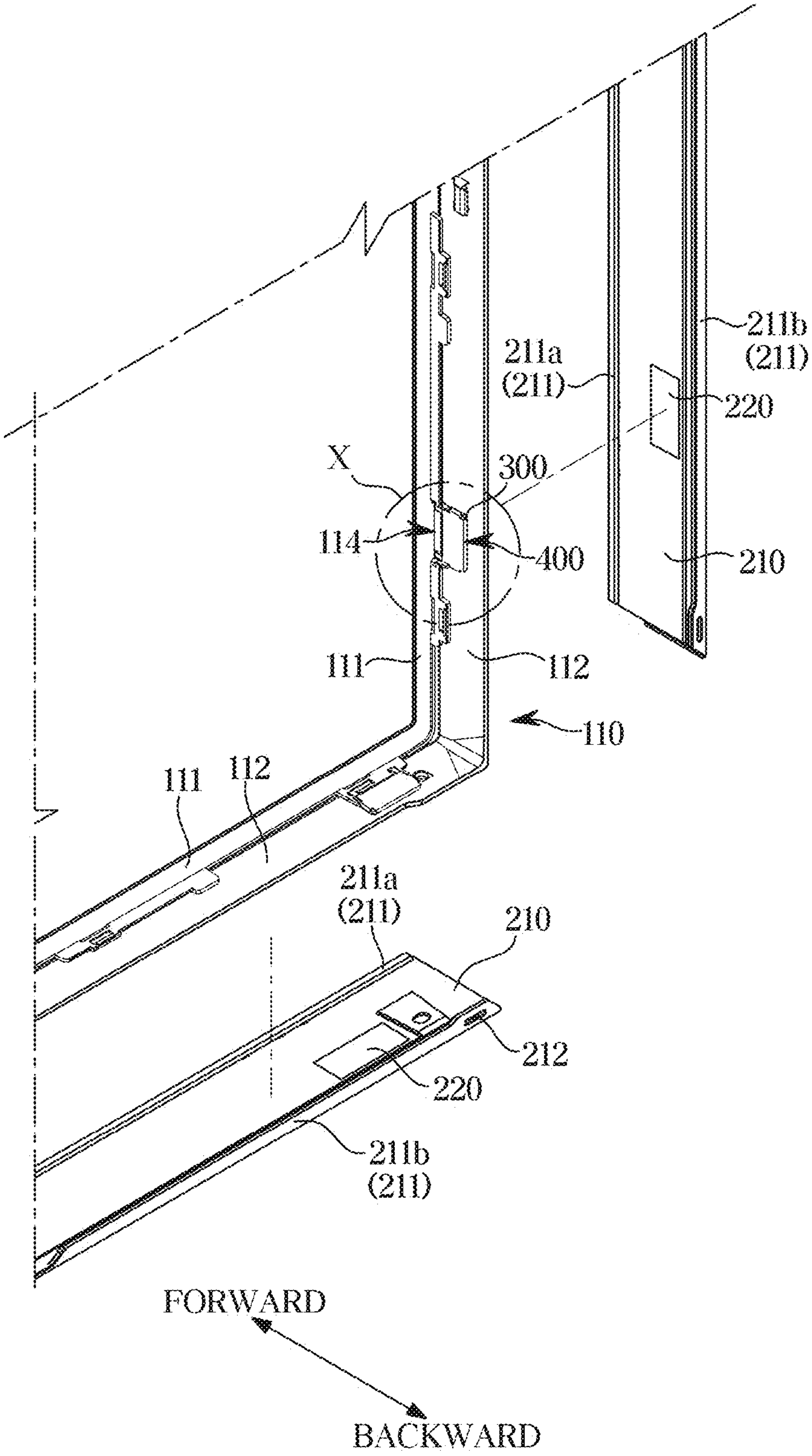
FIG. 6 is an enlarged view showing a coupling relationship between a top chassis and the chassis cover according to one or more embodiments of the disclosure.
Figure 7:
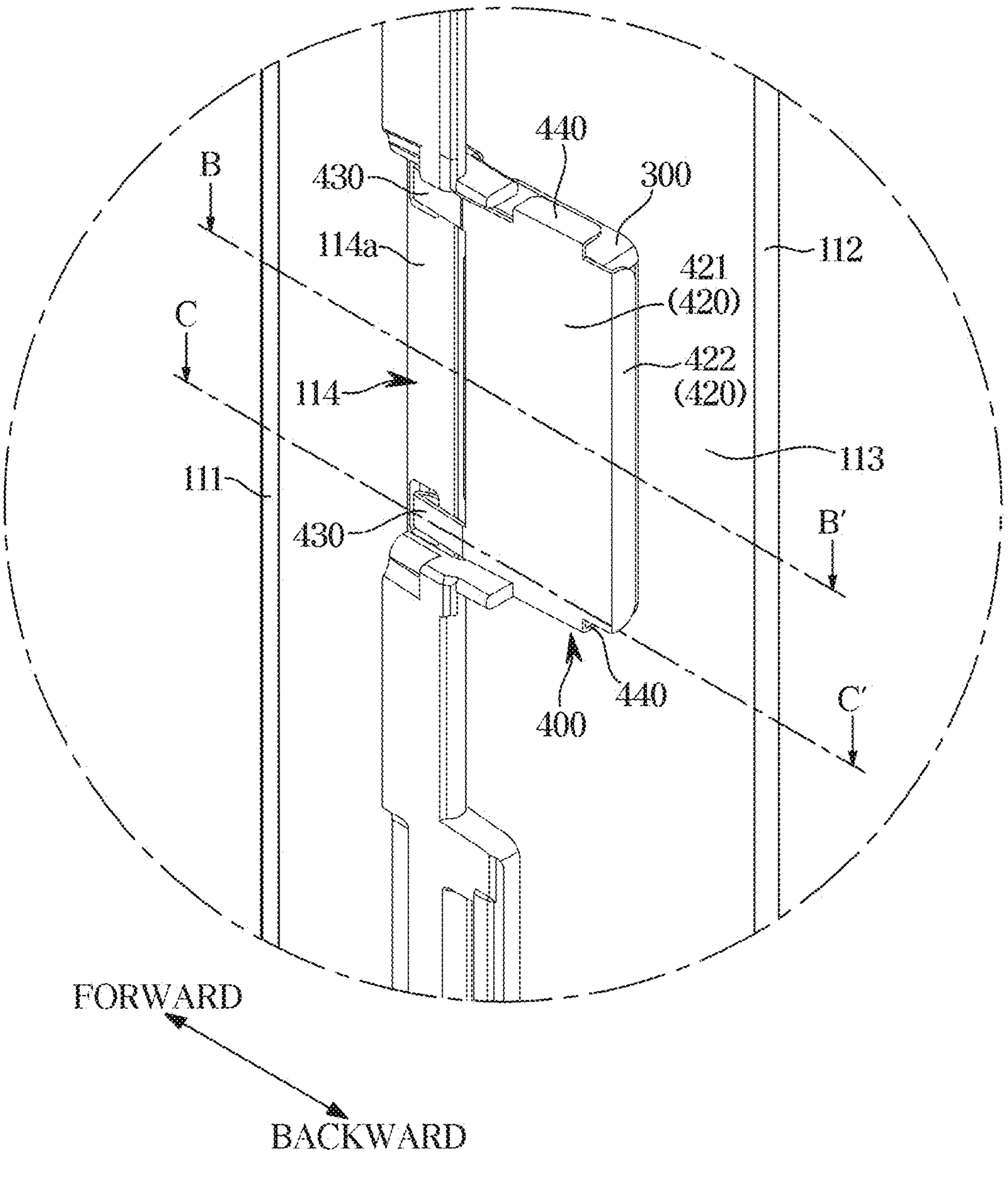
FIG. 7 is an enlarged view of X in FIG. 6 according to one or more embodiments of the disclosure.
Figure 8:
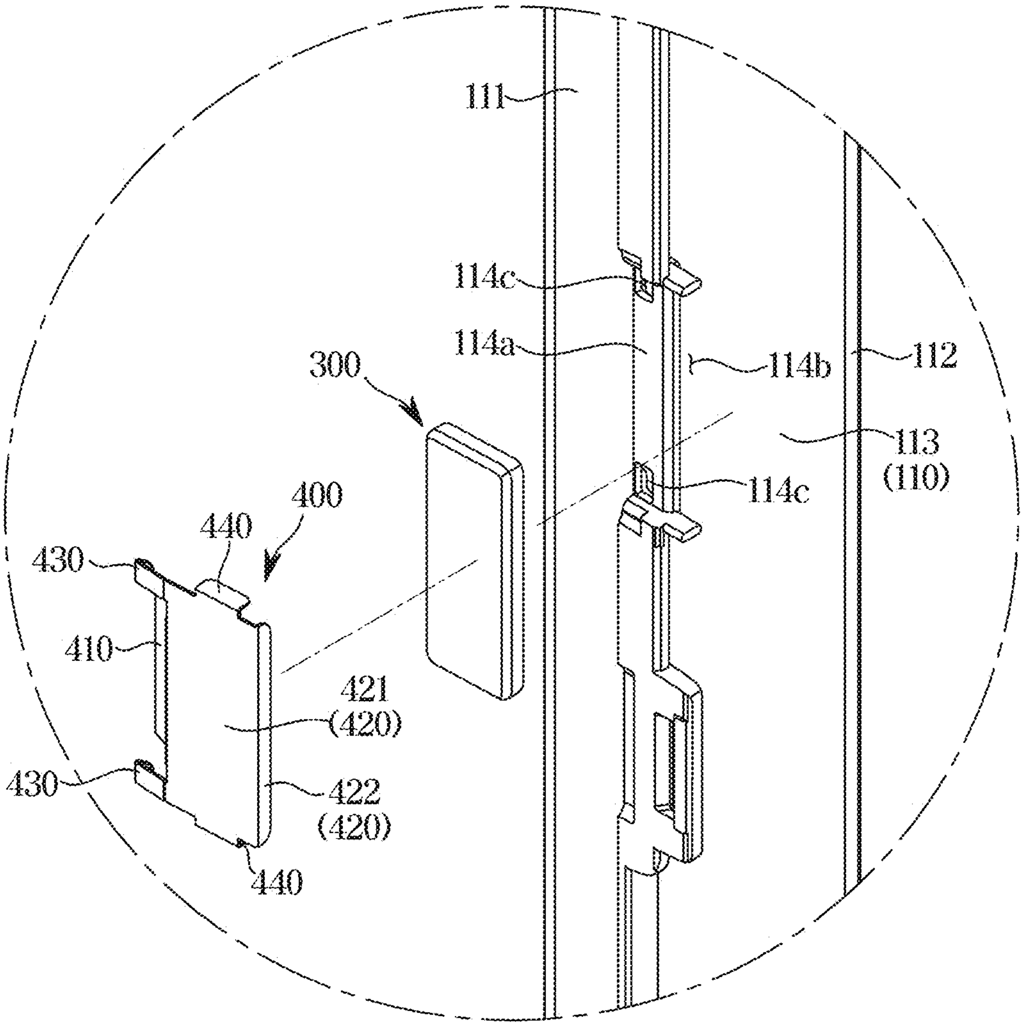
FIG. 8 is an enlarged view showing a connective relationship between a magnet, an elastic bracket, and the top chassis in FIG. 6 according to one or more embodiments of the disclosure.
Figure 9:
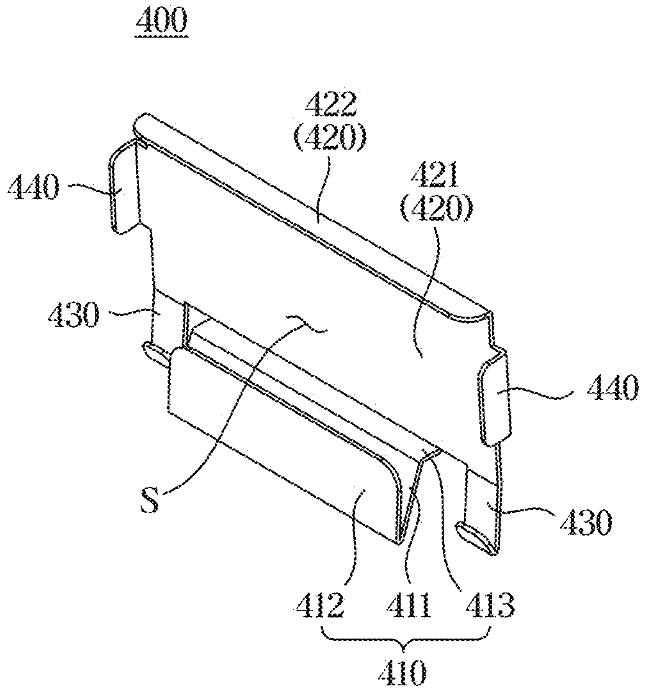
FIG. 9 is a perspective view showing the elastic bracket of FIG. 6 from one side according to one or more embodiments of the disclosure.
Figure 10:
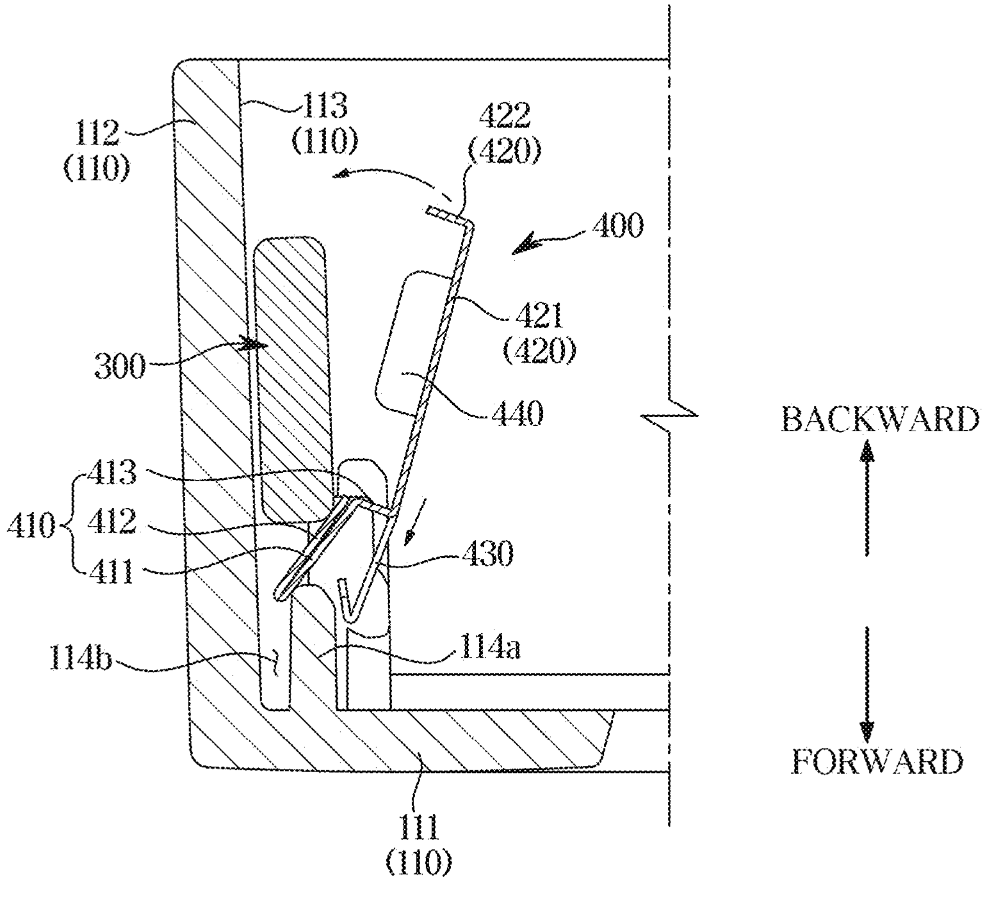
FIG. 10 is a cross-sectional view taken along line B-B' of FIG. 7 showing the elastic bracket being inserted into an interference groove according to one or more embodiments of the disclosure.
Figure 11:
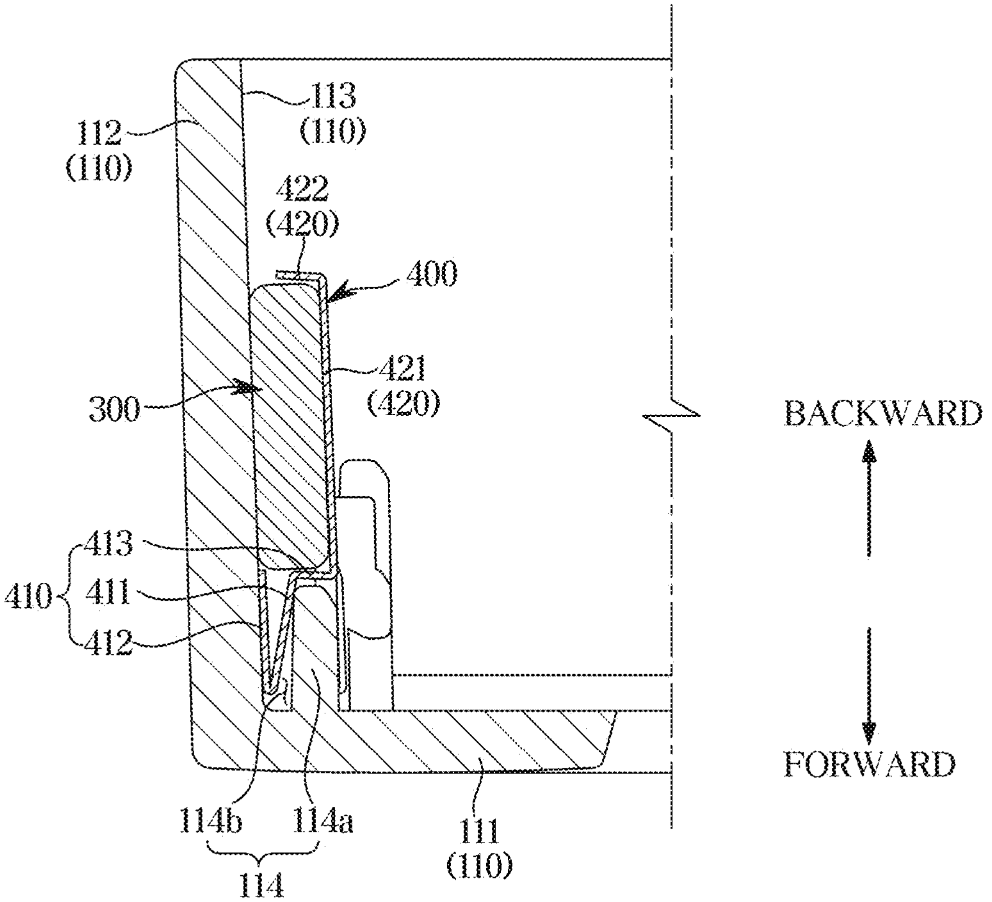
FIG. 11 is a cross-sectional view taken along line B-B' of FIG. 7 showing a state in which the elastic bracket attaches the magnet according to one or more embodiments of the disclosure.
Figure 12:
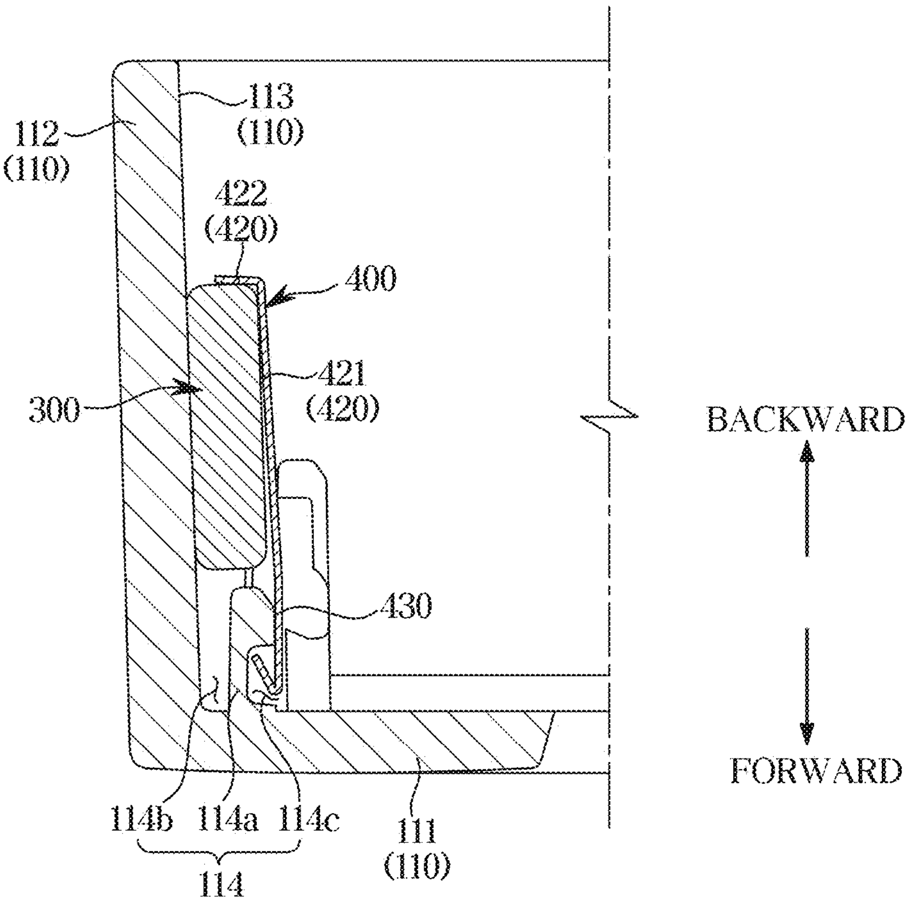
FIG. 12 is a cross-sectional view taken along line C-C' of FIG. 7, showing a state in which a fastening portion of the elastic bracket is fastened to the fastening groove of a magnet fastening portion according to one or more embodiments of the disclosure.

FIG. 6 is an enlarged view illustrating a coupling relationship between the top chassis and the chassis cover according to one or more embodiments. FIG. 7 is an enlarged view of X in FIG. 6. FIG. 8 is an enlarged view illustrating a connective relationship between the magnet, an elastic bracket, and the top chassis shown in FIG. 6. FIG. 9 is a view illustrating the elastic bracket of FIG. 6 as seen from one side. FIG. 10 is a cross-sectional view taken along line B-B' of FIG. 7, showing the elastic bracket being inserted into an interference groove. FIG. 11 is a cross-sectional view taken along line B-B' of FIG. 7, showing a state in which the elastic bracket holds a magnet. FIG. 12 is a cross-sectional view taken along line C-C' of FIG. 7, showing a state in which a fastening portion of the elastic bracket is fastened to a fastening groove of a magnet fastening portion.

Referring to FIGS. 6, 7, 8, 9, 10, 11, and 12, the chassis cover 200 may be detachably mounted to the outside of the top chassis 110 to cover the top chassis 110.

The top chassis 110 may be disposed along an outer periphery of the display panel 10 to support the display panel 10, and may be provided with a magnet fastening portion 114 on an inner side of which the magnet 300 is disposed.

The chassis cover 200 may include the cover body 210 and the metal sheet 220 disposed on the inner surface of the cover body 210. The metal sheet 220 may be attracted by magnetic force between the metal sheet 220 and the magnet 300 provided inside the top chassis 110. As a result, the chassis cover 200 may be removably mounted to the top chassis 110.

The top chassis 110 may include the bezel 111 supporting the front edge of the display panel 10 and the top sidewall 112 extending rearward from the bezel 111. The bezel 111 may be formed to have a width narrower than that of the top sidewall 112. However, the present disclosure is not limited to this, and according to one or more embodiments, the top chassis 110 may include only the bezel 111 without the top sidewall 112, and the sides of the display panel 10 may be formed to be supported by the bottom chassis 120.

The magnet 300 may be disposed on an inner surface 113 of the top sidewall 112. In the case where the top sidewall 112 is formed to have a width wider than that of the bezel 111, the magnet 300 may be positioned on the inner surface 113 of the top sidewall 112, which allows the magnet 300 to be positioned more easily than when the magnet 300 is positioned on an inner surface of the bezel 111. The chassis cover 200 may be more reliably mounted to the top chassis 110. However, the present disclosure is not limited thereto, and according to one or more embodiments, the magnet 300 may be positioned in various ways on the inside of the case 100 including the top chassis 110. The magnet 300 may be positioned on the inner surface of the bezel 111. Alternatively, according to one or more embodiments, when the top chassis 110 does not include the top sidewall 112 and the bottom chassis 120 supports the sides of the display panel 10, the magnet 300 may be disposed on the inner surface of the bottom chassis 120.

Hereinafter, for ease of description, the magnet 300 is assumed to be disposed on the inner surface 113 of the top chassis 110.

The magnet fastening portion 114 on which the magnet 300 is disposed may be provided in the inside of the top chassis 110, and the magnet 300 may be fastened to the magnet fastening portion 114 by an elastic bracket 400 placed on the inside of the top chassis 110.

The elastic bracket 400 may include an elastic material and interfere with an inner surface of the top chassis 110, and may function to bring the magnet 300 into close contact with the inner surface 113 of the top chassis 110.

The elastic bracket 400 may be configured to include an elastic metallic material. The metallic material constituting the elastic bracket 400 does not need to be a magnetic material, but may include a ferromagnetic material or a paramagnetic metallic material to more easily hold the magnet 300 to the magnet fastening portion 114. The elastic bracket 400 may be configured to include a permanent magnet material, but is not limited thereto. The elastic bracket 400 may be configured to include a variety of materials as long as it is an elastic material.

In detail, the elastic bracket 400 may include an interference portion 410 interfering with the magnet fastening portion 114, and a bracket body 420 on which the magnet 300 is mounted. The elastic bracket 400 may interfere with the magnet fastening portion 114 and the magnet 300, securing the magnet 300 to the magnet fastening portion 114, and ultimately securing the magnet 300 to the top chassis 110.

The magnet fastening portion 114 may include an interference groove **114*b*, and the interference portion 410 of the elastic bracket 400 may be provided to be inserted into the interference groove 114*b*, thereby interfering with the magnet fastening portion 114**.

The magnet fastening portion 114 may include an interference guide **114*a* that forms the interference groove 114*b* between the magnet fastening portion and the inner surface 113 of the top chassis 110. In this case, the interference portion 410 may be guided by the interference guide 114*a* and inserted into the interference groove 114*b*. However, the present disclosure is not limited thereto, and according to one or more embodiments, the magnet fastening portion 114 may form the interference groove 114*b* in various shapes without the interference guide 114*a***.

The interference guide **114*a* may be disposed side by side on the inner surface 113 of the top chassis 110. The interference guide 114*a* may be formed in a plurality corresponding to positions where the magnets 300 are disposed. However, the present disclosure is not limited thereto, and according to one or more embodiments, the interference guide 114*a* may be formed integrally along the inner surface 113 of the top chassis 110 regardless of the position on which the magnet 300** is disposed.

The interference guide **114*a* may be configured to include a plastic material. In a state in which the top chassis 110 is injection-molded from a plastic material, the interference guide 114*a* may also be injection-molded integrally with the bezel 111 and the top sidewall 112 of the top chassis 110. However, the present disclosure is not limited thereto, and according to one or more embodiments, the interference guide 114*a* may be formed separately and subsequently coupled to the top chassis 110**.

The interference guide **114*a* may include a fastening groove 114*c* for fastening the elastic bracket 400. The interference guide 114*a* may include the fastening groove 114*c* to which a fastening portion 430 of the elastic bracket 400** is fastened.

The fastening portion 430 of the elastic bracket 400 may be provided to be hook-coupled to the fastening groove **114*c*. The fastening groove 114*c* may not have a structure that penetrates the interference guide 114*a*, and may be formed concave in a direction in which the fastening portion 430 is fastened. Accordingly, the interference guide 114*a* in which the fastening groove 114*c* is formed may be easier to be injection molded, and the problem of die spot in in the mold may be reduced. However, the present disclosure is not limited thereto, and as shown in FIGS. 13, 14, 15, and 16, fastening portions 530 and 630 of elastic brackets 500 and 600 may be provided to be fastened to a fastening hole 1114*c* penetrating an interference guide 1114*a***.

The fastening groove **114*c* may be located on the interference guide 114*a* in a direction opposite to the direction in which the interference groove 114*b* is located. The fastening groove 114*c* may be formed concave to face a direction in which the interference guide 114*a* is located from a side opposite to the interference groove 114*b* of the interference guide 114*a*. The fastening groove 114*c* may be formed concavely from one surface of the interference guide 114*a* located in an inward direction of the display device 1 of the interference guide 114*a* toward the outside of the display device 1. In this case, the fastening portion 430 of the elastic bracket 400 may be fastened to the fastening groove 114*c* while surrounding one surface of the interference guide 114*a* located on the opposite side of the interference groove 114*b***.

The fastening portion 430 of the elastic bracket 400 may extend from a first cover portion 421 of the bracket body 420, which will be described later, and an end thereof may be bent to have a hook structure. The fastening portion 430 may extend from the first cover portion 421 toward the fastening groove **114*c*, and the end of the fastening portion 430 may have a structure that is bent in a direction opposite to the direction in which the fastening portion 430 extends from the first cover portion 421 to hook into the fastening groove 114***c*. However, the present disclosure is not limited thereto, and according to one or more embodiments, the fastening portion 430 may have a variety of shapes as long as it may be fastened to the fastening groove 114*c*.

The elastic bracket 400 may include a pair of fastening portions 430. The fastening grooves 114*c* may be formed as a pair correspondingly. As a result, the elastic bracket 400 may be more reliably fastened to the magnet fastening portion 114. However, the number of fastening portions and fastening groove are not limited thereto, and the number of fastening portions 430 and fastening grooves 114*c* may be formed in various ways. For example, the number of fastening portions 430 and fastening grooves 114*c* may be singular, or three or more. According to one or more embodiments, the number of fastening portions 430 and fastening grooves 114*c* may be different from each other. The number of fastening grooves 114*c* is greater than the number of fastening portions 430.

When the fastening portions 430 are provided as a pair, the interference portion 410 may be located between the pair of fastening portions 430. The pair of fastening portions 430 may include at least a first fastening portion and a second fastening portion. Correspondingly, the fastening grooves 114*c* of the magnet fastening portion 114 may also be provided as a pair, and the interference portion 410 may be located between the pair of fastening grooves 114*c*. However, the present disclosure is not limited thereto, and according to one or more embodiments, the interference portion 410 may be disposed in various positions relative to the fastening portion 430 and the fastening groove 114*c*.

Although the magnet fastening portion 114 does not have a separate interference guide 114*a*, the fastening groove 114*c* may be suitably formed at a position where the fastening portion 430 of the elastic bracket 400 may be fastened to the magnet fastening portion 114.

The interference portion 410 may include an elastic material and be formed to be squeezed as the interference portion 410 is inserted into the interference groove 114*b*. When inserted into the interference groove 114*b*, the interference portion 410 may be pressed and squeezed by the interference guide 114*a* and the inner surface 113 of the top chassis 110.

The interference portion 410 may include a first contact portion 411 in contact with the interference guide 114*a*, and a second contact portion 412 extending from the first contact portion 411 and in contact with the inner surface 113 of the top chassis 110. The first contact portion 411 and the second contact portion 412 may each have a planar shape.

When the interference portion 410 is inserted into the interference groove 114*b*, the first contact portion 411 may be pressed against the interference guide 114*a* and the second contact portion 412 may be pressed against the inner surface 113 of the top chassis 110. The first contact portion 411 and the second contact portion 412 may interfere with the interference guide 114*a* and the inner surface 113 of the top chassis 110, respectively. When the interference portion 410 is inserted into the interference groove 114*b*, the first contact portion 411 and the second contact portion 412 may be squeezed to come closer to each other because the interference portion 410 includes an elastic material. In a state before the interference portion 410 is inserted into the interference groove 114*b*, the first contact portion 411 and the second contact portion 412 may have a predetermined angle therebetween, and after the interference portion 410 is inserted into the interference groove 114*b*, the angle therebetween may become smaller than the predetermined angle before insertion.

When the interference portion 410 is inserted into the interference groove 114*b*, the first contact portion 411 may be provided to be in close contact with the inner surface 113 of the top chassis 110 in parallel. As the second contact portion 412 forms a predetermined angle with the first contact portion 411, the second contact portion 412 may be inclined to form a certain angle with the inner surface 113 of the top chassis 110 or the interference guide 114*a*. However, the present disclosure is not limited thereto, and according to one or more embodiments, the first contact portion 411 and the second contact portion 412 may be provided in various ways as long as they may interfere with the interference guide 114*a* and the inner surface 113 of the top chassis 110, respectively.

The interference portion 410 may include a magnet support portion 413 extending from the first contact portion 411 to support one surface of the magnet 300.

The magnet support portion 413 may connect between the first contact portion 411 and the bracket body 420. In detail, the magnet support portion 413 may connect the first contact portion 411 and the first cover portion 421 of the bracket body 420, which will be described later. In other words, the magnet support portion 413 may extend from the first contact portion 411 and at the same time extend from the first cover portion 421 to connect the first contact portion 411 and the first cover portion 421.

One side of the magnet support portion 413 may support one side of the magnet 300, and the other side of the magnet support portion 413 may be supported by the interference guide 114*a*.

The magnet support portion 413 may be formed to form a predetermined angle with the first contact portion 411. Alternatively, according to one or more embodiments, the magnet support portion 413 may be formed to form a predetermined angle with the bracket body 420. The magnet support portion 413 may be formed to form a predetermined angle with the first cover portion 421 of the bracket body 420.

The magnet support portion 413 may be formed to be perpendicular to the inner surface 113 of the top chassis 110 with which the magnet 300 is in close contact. For example, when the magnet 300 is disposed on the top sidewall 112 of the top chassis 110, the magnet support portion 413 may be formed to be perpendicular to the top sidewall 112 and parallel to the bezel 111. However, the present disclosure is not limited thereto, and according to one or more embodiments, the magnet support portion 413 may be formed in a variety of ways.

The interference portion 410 may be connected to the bracket body 420 by the magnet support portion 413, so that the restoring force received by the interference portion 410 when it interferes with the magnet fastening portion 114 may be prevented from being transmitted to the bracket body 420.

Because the interference portion 410 includes the magnet support portion 413, the elastic bracket 400 may reliably secure the magnet 300. However, the present disclosure is not limited thereto, and according to one or more embodiments, the interference portion 410 may not include a configuration that supports one surface of the magnet 300. In this case, the configuration of the elastic bracket 400 in contact with the magnet 300 may be the bracket body 420.

The first contact portion 411, the second contact portion 412, and the magnet support portion 413 may be formed integrally. The first contact portion 411, the second contact portion 412, and the magnet support portion 413 may be machined by a press method.

The elastic bracket 400 may include the bracket body 420 to which the magnet 300 is mounted. The bracket body 420 may be provided to interfere with the magnet 300 to bring the magnet 300 into close contact with the inner surface 113 of the top chassis 110 and to secure the magnet 300 to the magnet fastening portion 114. The bracket body 420 may cover an outer surface of the magnet 300 and may be provided to press the magnet 300 toward the inner surface 113 of the top chassis 110.

The bracket body 420 may cover at least a portion of the outer surface of the magnet 300. The bracket body 420 may interfere with at least a portion of the outer surface of the magnet 300. Specifically, the bracket body 420 may include the first cover portion 421 that covers the outer surface of the magnet 300 located on the opposite side of the top chassis 110. In other words, the bracket body 420 may include the first cover portion 421 to cover the other side opposite to the one side of the magnet 300 that is in close contact with the inner surface 113 of the top chassis 110.

The first cover portion 421 may press the magnet 300 against the top chassis 110 side. Specifically, the first cover portion 421 may press the magnet 300 in a direction of the inner surface 113 of the top chassis 110 with which the magnet 300 is in close contact. In a state in which the magnet 300 is disposed on the top sidewall 112, the first cover portion 421 may be provided to press the magnet 300 against the top sidewall 112 side.

The bracket body 420 may include a second cover portion 422 extending from the first cover portion 421 to cover at least a portion of the outer surface different from the outer surface of the magnet 300 covered by the first cover portion 421. The bracket body 420 may include the first cover portion 421 and the second cover portion 422, thus the first cover portion 421 may cover the outer surface of the magnet located on the opposite side of the top chassis 110, and the second cover portion 422 may cover at least a portion of another outer surface of the outer surfaces of the magnet 300.

The second cover portion 422 may cover one surface of the magnet 300 that is adjacent to one surface of the top chassis 110 with which the magnet 300 is in close contact, of the outer surfaces of the magnet 300. In a state in which the inner surface 113 of the top chassis 110 on which the magnet 300 is disposed is the top sidewall 112, the second cover portion 422 may cover one surface of the outer surfaces of the magnet 300 that faces the bezel 111.

The second cover portion 422 may press at least a portion of the outer surface of the magnet 300 adjacent to the outer surface of the magnet 300 that is pressed by the first cover portion 421, of the outer surfaces of the magnet 300. The second cover portion 422 may be positioned to face the interference portion 410, thereby pressing the magnet 300 against the interference portion 410 side. The second cover portion 422 may press the magnet 300 in a direction with one surface perpendicular to the inner surface 113 of the top chassis 110 against which the magnet 300 is in close contact. In a state in which the magnet 300 is disposed on the top sidewall 112, the second cover portion 422 may be provided to press the magnet 300 against the bezel 111 side. The second cover portion 422 may press the magnet 300 against the interference guide 114*a* side.

The first cover portion 421 and the second cover portion 422 may each be formed in a plate shape, and may be formed to surround the magnet 300 by forming a predetermined angle. The second cover portion 422 may extend to be bent from the first cover portion 421 to cover the outer surface of the magnet 300.

As the first cover portion 421 approaches the second cover portion 422, the first cover portion 421 may be formed to be inclined to approach the inner surface 113 of the top chassis 110 on which the magnet 300 is seated. The first cover portion 421 may more efficiently press the magnet 300 against the inner surface 113 of the top chassis 110 side. Such a structure may allow the second cover portion 422 to be more closely pressed against the outer surface of the magnet 300 to effectively press the magnet 300. However, the present disclosure is not limited thereto, and according to one or more embodiments, the first cover portion 421 may be formed to be parallel to the inner surface 113 of the top chassis 110.

The bracket body 420 may comprise an elastic material to bring the magnet 300 into close contact with the inner surface 113 of the top chassis 110. The bracket body 420 may include an elastic material to press the outer surface of the magnet 300 located on the opposite side of the top chassis 110 against the top chassis 110 side, thereby bringing the magnet 300 into close contact with the inner surface 113 of the top chassis 110. The first cover portion 421 may be configured to include an elastic material, and may press the outer surface of the magnet 300 located on the side opposite to the inner surface 113 of the top chassis 110 toward the inner surface 113 of the top chassis 110 side, thereby bringing the magnet 300 into close contact with the inner surface 113 of the top chassis 110.

The second cover portion 422 may be configured to include an elastic material, which may bring the magnet 300 into close contact with the top chassis 110. The second cover portion 422 may be configured to include an elastic material, and may press the outer surface of the magnet 300 in the direction perpendicular to the inner surface 113 of the top chassis 110 on which the magnet 300 is disposed, thereby pressing the magnet 300 against the top chassis 110 side.

The bracket body 420 may be formed in a size corresponding to the size of the magnet 300 The first cover portion 421 and the second cover portion 422 may form a receiving space S for receiving the magnet 300. According to one or more embodiments, the magnet support portion 413 described above may also form the receiving space S together with the first cover portion 421 and the second cover portion 422.

The elastic bracket 400 may include an anti-separation portion 440 that, in addition to the outer surface of the magnet 300 that is pressed against the inner surface 113 of the top chassis 110 side or one surface side perpendicular thereto, supports at least a portion of another outer surface of the outer surfaces of the magnet 300 to stably secure the magnet 300 and prevent the magnet 300 from deviating.

The anti-separation portion 440 may cover at least a portion of the outer surface of the magnet 300 that is different from the outer surface of the magnet 300 covered by the first cover portion 421 or the second cover portion 422 of the bracket body 420 to support the magnet 300. The anti-separation portion 440 may extend from the first cover portion 421 and may be provided to cover another outer surface of the magnet 300 that is different from the second cover portion 422.

According to one or more embodiments, a plurality of anti-separation portions 440 may be provided. The anti-separation portions 440 may be provided as a pair to form the receiving space S together with the first cover portion 421, the second cover portion 422, and the like. The pair of anti-separation portions 440 may be arranged to face each other. However, the present disclosure is not limited thereto, and according to one or more embodiments, the anti-separation portion 440 may be formed in various numbers.

The anti-separation portion 440 may be configured to include an elastic material. The anti-separation portion 440 may cover at least a portion of the outer surface of the magnet 300, and may fasten the magnet 300 as it interferes with the magnet 300. The anti-separation portion 440 may be included in the second cover portion 422 of the bracket body 420. As a result, the elastic bracket 400 may more efficiently secure the magnet 300 to the top chassis 110.

With the above configuration, the magnet 300 may be fastened to the magnet fastening portion 114 provided inside the case 100 using the elastic bracket 400. The display device 1 may include the chassis cover 200 that is detachably mounted to the outer surface of the case 100 by attraction with the magnet 300, and may decorate the exterior of the case 100 in various ways.

Figure 13:
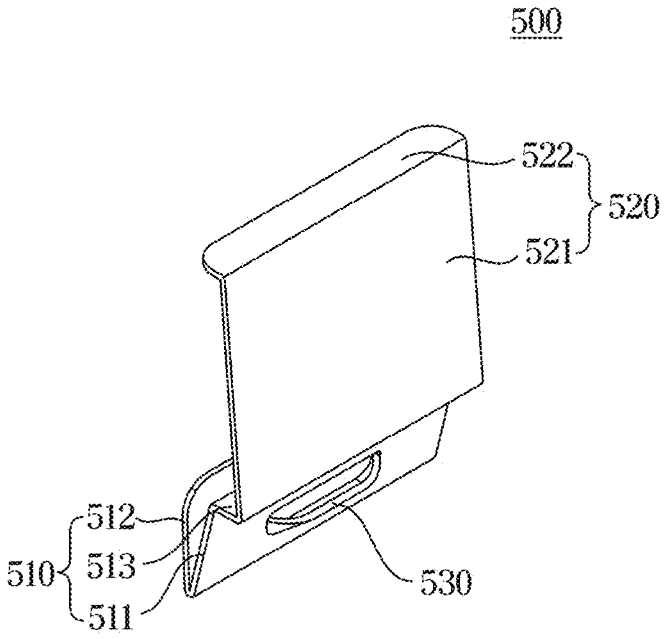
FIG. 13 is a perspective view showing an elastic bracket according to one or more embodiments of the disclosure.
Figure 14:
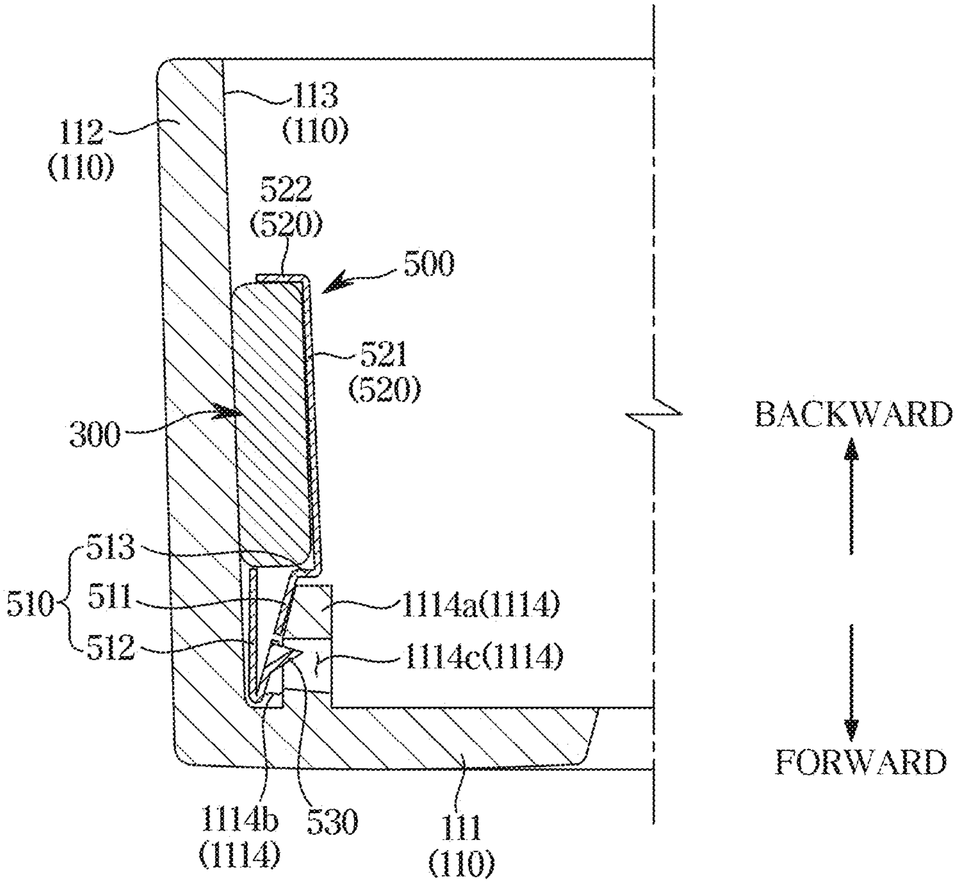
FIG. 14 is a cross-sectional view showing a state in which the elastic bracket of FIG. 13 secures the magnet according to one or more embodiments of the disclosure.

FIG. 13 is a perspective view illustrating the elastic bracket according to one or more embodiments. FIG. 14 is a cross-sectional view illustrating a state in which the elastic bracket of FIG. 13 secures the magnet.

With reference to FIGS. 13 and 14, an elastic bracket according to another embodiment of the present disclosure will be described. In describing the embodiment shown in FIGS. 13 and 14, the same components as those shown in FIGS. 1, 2, 3, 4, 5, 6, 7, 8, 9, 10, 11, and 12 may be assigned the same reference numerals and omitted from description.

Referring to FIGS. 13 and 14, the display device 1 may include an elastic bracket 500 to secure the magnet 300 to the top chassis 110. The display device 1 may hold the magnet 300 to a magnet fastening portion 1114 by using the elastic bracket 500 comprising an elastic material.

The elastic bracket 500 may include an interference portion 510 that interferes with the magnet fastening portion 1114, and a bracket body 520 to which the magnet 300 is mounted.

The interference portion 510 may be inserted into an interference groove 1114*b*. The interference groove 1114*b* may be formed by the interference guide 1114*a*, and may be guided by the interference guide 1114*a* when the interference portion 510 is inserted into the interference groove 1114*b*.

The interference portion 510 may include a first contact portion 511 in contact with the interference guide 1114*a*, and a second contact portion 512 extending from the first contact portion 511 and in contact with the inner surface 113 of the top chassis 110. The first contact portion 511 and the second contact portion 512 may be formed to have a predetermined angle. When the interference portion 510 is inserted into the interference groove 1114*b*, the first contact portion 511 and the second contact portion 512 may be provided to be retractable because the first contact portion 511 and the second contact portion 512 comprise an elastic material.

The interference portion 510 may include a magnet support portion 513 extending from the first contact portion 511 to support one surface of the magnet 300. The first contact portion 511 and the bracket body 520, particularly a first cover portion 521 of the bracket body 520, may be connected by the magnet support portion 513. One surface of the magnet support portion 513 may support the magnet 300, and the opposite surface thereof may be supported by the interference guide 1114*a*.

The bracket body 520 may cover at least a portion of the outer surface of the magnet 300 to interfere with the magnet 300. The bracket body 520 may comprise an elastic material, and may be provided to bring the magnet 300 into close contact with the inner surface 113 of the top chassis 110.

The bracket body 520 may include the first cover portion 521 covering the outer surface of the magnet 300 located on the opposite side of the top chassis 110, and a second cover portion 522 extending from the first cover portion 521 to cover at least a portion of another outer surface of the outer surfaces of the magnet 300.

The first cover portion 521 may be provided to press the outer surface of the magnet 300 against the inner surface 113 side of the top chassis 110. The second cover portion 522 may press another outer surface of the magnet 300 that is not covered by the first cover portion 521 against the top chassis 110 side. When the magnet 300 is disposed on the top sidewall 112, the second cover portion 522 may press the magnet 300 against the bezel 111 side.

The first cover portion 521 may be formed to be sloped toward the second cover portion 522 to approach the inner surface 113 of the top chassis 110 on which the magnet 300 is seated.

The first cover portion 521 and the second cover portion 522 may form the receiving space S in which the magnet 300 is received.

The elastic bracket 500 may include the fastening portion 530 provided to be fastened to the magnet fastening portion 1114. The magnet fastening portion 1114 may include the fastening hole 1114*c*, and the fastening portion 530 may be formed to be fastened to the fastening hole 1114*c*.

The fastening hole 1114*c* may be formed to penetrate the interference guide 1114*a*. In a state in which the interference guide 1114*a* is injection-molded from a plastic material, the fastening hole 1114*c* may also be formed at the same time as the interference guide 1114*a* is injection-molded. However, the present disclosure is not limited thereto, and according to one or more embodiments, the fastening hole 1114*c* may be formed in various ways.

According to one or more embodiments, the fastening portion 530 may be formed on the interference portion 510. The fastening portion 530 may be formed to protrude from the first contact portion 511 against the interference guide 1114*a* side, and may be formed at a position corresponding to a position of the fastening hole 1114*c*. The fastening portion 530 may be located at the center of the first contact portion 511. According to one or more embodiments, the fastening portion 530 may be formed singularly. However, the present disclosure is not limited thereto, and according to one or more embodiments, the fastening portions 530 may be disposed in various positions and may be provided in various numbers.

The fastening portion 530 may be machined to protrude from the elastic bracket 500 by a press method. The fastening portion 530 may be machined to protrude from the first contact portion 511 by a press method.

Figure 15:
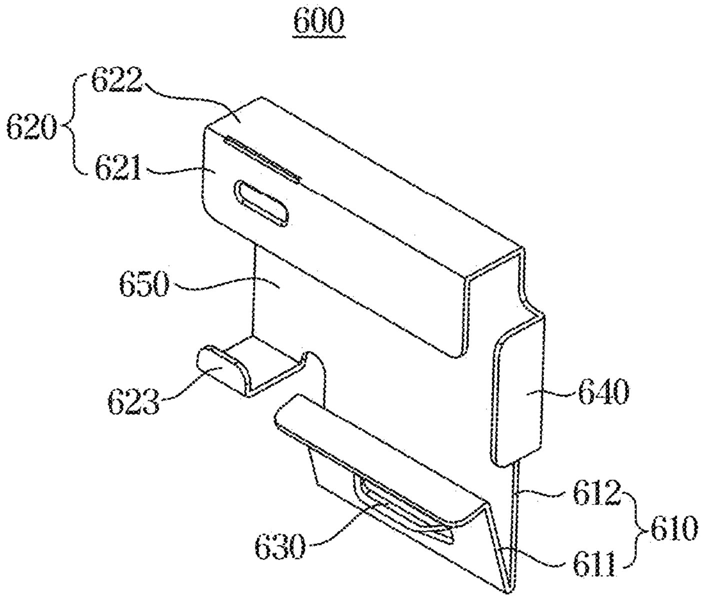
FIG. 15 is a perspective view showing an elastic bracket according to one or more embodiments of the disclosure.
Figure 16:
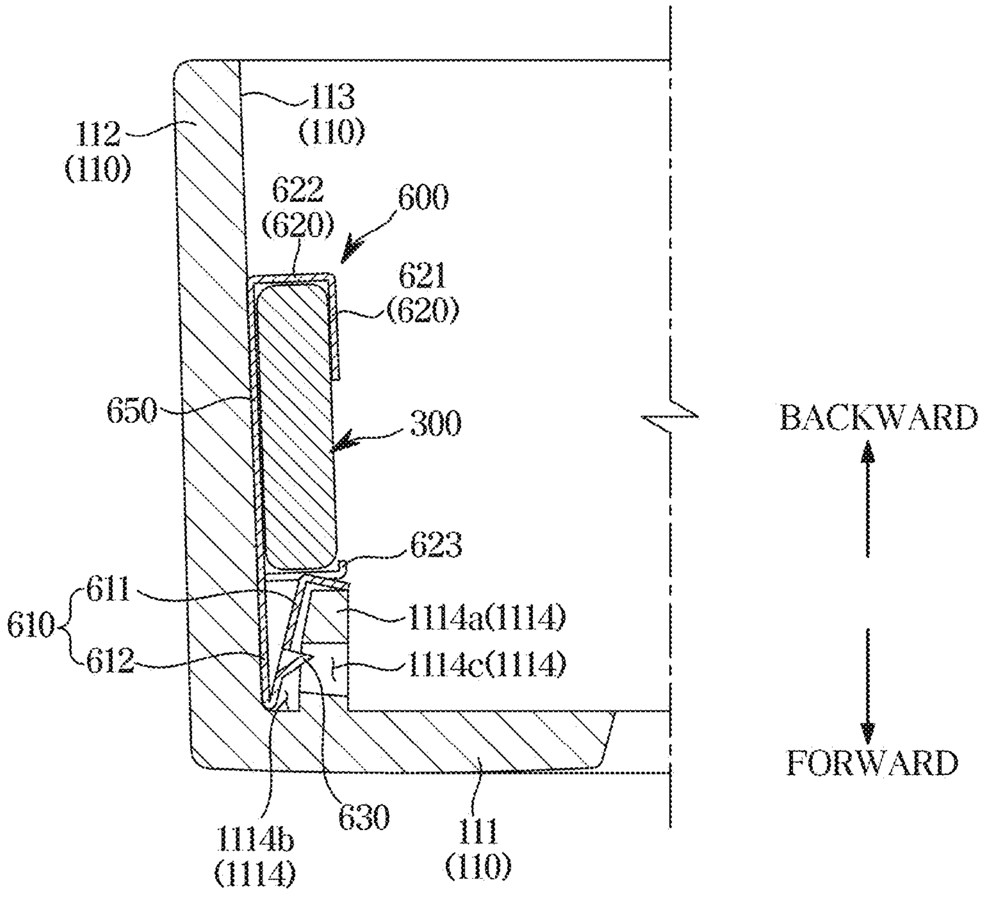
FIG. 16 is a cross-sectional view showing a state in which the elastic bracket of FIG. 15 secures the magnet according to one or more embodiments of the disclosure.

FIG. 15 is a perspective view illustrating an elastic bracket according to one or more embodiments. FIG. 16 is a cross-sectional view illustrating a state in which the elastic bracket of FIG. 15 secures the magnet.

With reference to FIGS. 15 and 16, an elastic bracket according to one or more embodiments will be described. In describing one or more embodiments shown in FIGS. 15 and 16, the same components as those shown in FIGS. 1, 2, 3, 4, 5, 6, 7, 8, 9, 10, 11, 12, 13, and 14 may be assigned the same reference numerals and omitted from description.

Referring to FIGS. 15 and 16, the display device 1 may include an elastic bracket 600 to secure the magnet 300 to the top chassis 110. The display device 1 may hold the magnet 300 to the magnet fastening portion 1114 by using the elastic bracket 600 comprising an elastic material.

The elastic bracket 500 may include an interference portion 610 that interferes with the magnet fastening portion 1114, and a bracket body 620 to which the magnet 300 is mounted.

The interference portion 610 may be inserted into the interference groove 1114*b*. The interference groove 1114*b* may be formed by the interference guide 1114*a*, and may be guided by the interference guide 1114*a* when the interference portion 610 is inserted into the interference groove 1114*b*.

The interference portion 610 may include a first contact portion 611 in contact with the interference guide 1114*a*, and a second contact portion 612 extending from the first contact portion 611 and in contact with the inner surface 113 of the top chassis 110. The first contact portion 611 and the second contact portion 612 may be formed to have a predetermined angle. When the interference portion 610 is inserted into the interference groove 1114*b*, the first contact portion 611 and the second contact portion 612 may be provided to be retractable because the first contact portion 611 and the second contact portion 612 comprise an elastic material.

The second contact portion 612 may be formed to cover one surface of the magnet 300, and to extend from a magnet seating portion 650 located between the magnet 300 and the inner surface 113 of the top chassis 110 on which the magnet 300 is disposed.

The bracket body 620 may include the magnet seating portion 650. The magnet seating portion 650 may be provided to connect between the interference portion 610 and the bracket body 620.

The magnet seating portion 650 may be provided to seat the magnet 300 and to be in contact with the inner surface 113 of the top chassis 110. The magnet seating portion 650 may be formed in a size corresponding to the size of the magnet 300.

The bracket body 620 may cover at least a portion of the outer surface of the magnet 300. The bracket body 620 may comprise an elastic material, and may be provided to bring the magnet 300 into close contact with the inner surface 113 of the top chassis 110.

The bracket body 620 may include a first cover portion 621 covering the outer surface of the magnet 300 located on the opposite side of the top chassis 110, and a second cover portion 622 extending from the first cover portion 621 to cover at least a portion of another outer surface of the outer surfaces of the magnet 300.

The second cover portion 622 may be formed to extend from the magnet seating portion 650. The second cover portion 622 may be formed to connect between the first cover portion 621 and the second cover portion 622.

The first cover portion 621 may be provided to press the outer surface of the magnet 300 against the inner surface 113 of the top chassis 110 side. Alternatively, according to one or more embodiments, the first cover portion 621 may be provided to press the outer surface of the magnet 300 against the magnet seating portion 650 side. The second cover portion 622 may press the other outer surface of the magnet 300 that is not covered by the first cover portion 621 against the top chassis 110 side. In a state in which the magnet 300 is disposed on the top sidewall 112, the second cover portion 622 may press the magnet 300 against the bezel 111 side.

The elastic bracket 600 may include a magnet support portion 623 supporting one surface of the magnet 300. The magnet support portion 623 may extend from the magnet seating portion 650. One surface of the magnet support portion 623 may support the outer surface of the magnet 300, and the opposite surface may be supported by the interference guide 1114*a*.

The elastic bracket 600 may include an anti-separation portion 640 that, in addition to the outer surface of the magnet 300 that is pressed against the inner surface 113 of the top chassis 110 side or one surface side perpendicular thereto, supports at least a portion of another outer surface of the outer surfaces of the magnet 300 to stably secure the magnet 300 and prevent the magnet 300 from deviating.

The anti-separation portion 640 may cover at least a portion of the outer surface of the magnet 300 that is different from the outer surface of the magnet 300 covered by the first cover portion 421, the second cover portion 422, or the magnet seating portion 650 of the bracket body 420 to support the magnet 300. The anti-separation portion 640 may extend from the magnet seating portion 650, and may be provided to cover another outer surface of the magnet 300 that is different from the first cover portion 621 and the second cover portion 622.

The anti-separation portion 640 may be configured to include an elastic material. The anti-separation portion 640 may cover at least a portion of the outer surface of the magnet 300, and may fasten the magnet 300 as it interferes with the magnet 300. According to one or more embodiments, the anti-separation portion 640 may be included in the second cover portion 622 of the bracket body 620. As a result, the elastic bracket 600 can more efficiently secure the magnet 300 to the top chassis 110.

The elastic bracket 600 may include the fastening portion 630 provided to be fastened to the magnet fastening portion 1114. The magnet fastening portion 1114 may include the fastening hole 1114*c*, and the fastening portion 630 may be formed to be fastened to the fastening hole 1114*c*.

The fastening hole 1114*c* may be formed to penetrate the interference guide 1114*a*. In a state in which the interference guide 1114*a* is injection-molded from a plastic material, the fastening hole 1114*c* may also be formed at the same time as the interference guide 1114*a* is injection-molded. However, the present disclosure is not limited thereto, and according to one or more embodiments, the fastening hole 1114*c* may be formed in various ways.

According to one or more embodiments. the fastening portion 630 may be formed on the interference portion 610. The fastening portion 630 may be formed to protrude from the first contact portion 611 against the interference guide 1114*a* side, and may be formed at a position corresponding to a position of the fastening hole 1114*c*. The fastening portion 630 may be located at the center of the first contact portion 611. According to one or more embodiments, the fastening portion 630 may be formed singularly. However, the present disclosure is not limited thereto, and according to one or more embodiments, the fastening portions 630 may be disposed in various positions and may be provided in various numbers.

The fastening portion 630 may be machined to protrude from the elastic bracket 600 by a press method. The fastening portion 630 may be machined to protrude from the first contact portion 611 by a press method.

Although certain example embodiments are illustrated and described above, the present disclosure is not limited to said certain embodiments, various applications may of course be performed by those skilled in the art without deviating from what is claimed in the scope of claims, and such applications should not be understood separately from the technical idea or prospects herein.

What is claimed is:

1. A display apparatus comprising:
a case including a top chassis and a bottom chassis;
a display panel received in the case; and
a chassis cover configured to be detachably mounted to the case and cover at least a portion of an outer periphery of the case when mounted to an outside of the case;
wherein the top chassis comprises:
a bezel configured to cover a front edge of the display panel; and
a top sidewall disposed at a rear side of the bezel and configured to cover a side edge of the display panel;
wherein the bottom chassis comprises metal material,
wherein the chassis cover comprises:
a cover body configured to be mounted to the case, wherein the cover body covers the bezel and the top sidewall when the chassis cover is mounted to the case;
a magnet provided in a portion of the cover body which covers the top sidewall, the magnet being configured to detachably mount the chassis cover to the case by a magnetic force between the case and the magnet, and
a support rib protruding from the cover body;
wherein the support rib comprises:
a front support rib protruding inwardly from a portion of the cover body which covers the bezel toward the case, covering an end of the bezel opposite to the top sidewall, and spaced apart from the end of the bezel opposite to the top sidewall, in a state in which the chassis cover is mounted to the case; and
a rear support rib protruding from a portion of the cover body which covers the top sidewall toward the case and covering a rear end of the top sidewall, in the state in which the chassis cover is mounted to the case.

2. The display apparatus of claim 1, wherein the portion of the cover body which covers the top sidewall is spaced apart from the top sidewall in the state in which the chassis cover is mounted to the case.

3. The display apparatus of claim 1, wherein the front support rib protrudes rearward from an end of the portion of the cover body which covers the bezel.

4. The display apparatus of claim 1, wherein the rear support rib protrudes from a rear end of the portion of the cover body which covers the top sidewall.

5. The display apparatus of claim 1, wherein the portion of the cover body which covers the bezel extends from a front end of the portion of the cover body which covers the top sidewall, and
wherein the rear support rib extends from the portion of the cover body which covers the top sidewall parallel to the portion of the cover body which covers the bezel.

6. The display apparatus of claim 1, wherein the cover body comprises a plurality of cover bodies, and
wherein the display apparatus further comprises a chassis cover coupler configured to couple a pair of cover bodies adjacent to each other among the plurality of cover bodies.

7. The display apparatus of claim 6, wherein the chassis cover coupler is configured to fix the pair of cover bodies each other at a rear side.

8. The display apparatus of claim 6, wherein the rear support rib of each of the pair of the cover bodies comprises a chassis cover coupling groove, and
wherein the chassis cover coupler comprises a plurality of coupling protrusions, each of the plurality of coupling protrusions being configured to be inserted into the chassis cover coupling groove and couple the pair of cover bodies adjacent to each other among the plurality of cover bodies.

9. The display apparatus of claim 8, wherein the chassis cover coupling groove is at a rear side of the case in the state in which the chassis cover is mounted to the case.

10. The display apparatus of claim 6, wherein the plurality of cover bodies are configured to cover each side of the case.

11. A display apparatus comprising:
a display panel;
a case configured to support the display panel, the case including a top chassis and a bottom chassis;
a chassis cover comprising:
a plurality of cover bodies, each configured to be detachably mounted to the case; and
a plurality of magnets are disposed on an inner surface of each of the plurality of cover bodies which faces the case, so that each of the plurality of cover bodies is mountable to the case by a magnetic force between the case and each of the plurality of magnets,
a chassis cover coupler configured to couple the plurality of cover bodies each other at a rear side, in a state in which the plurality of cover bodies is mounted to the case,
wherein the top chassis comprises:
a bezel configured to cover a front edge of the display panel; and
a top sidewall extending rearward from the bezel and configured to cover a side edge of the display panel,
wherein the chassis cover comprises:
a front support rib protruding from a bezel cover portion of each of the plurality of cover bodies toward the case, covering an end of the bezel opposite to the top sidewall, in a state in which the chassis cover is mounted to the case; and
a rear support rib protruding from a sidewall cover portion of each of the plurality of cover bodies toward the case and covering a rear end of the top sidewall, in the state in which the chassis cover is mounted to the case, and
wherein the chassis cover coupler comprises a plurality of coupling protrusions, each of which is to be coupled to the rear support rib protruding from each of the plurality of cover bodies, so as to couple the plurality of cover bodies each other.

12. The display apparatus of claim 11, wherein the rear support rib comprises a chassis cover coupling groove into which the plurality of coupling protrusions is inserted to couple the plurality of cover bodies each other.

13. A chassis cover for a display apparatus, the chassis cover being configured to be detachably mounted to a case including a top chassis and a bottom chassis, the top chassis including a bezel configured to cover a front edge of a display panel and a top sidewall configured to cover a side edge of the display panel, the bottom chassis being configured to cover a rear side of the display panel and including a metal material, the chassis cover being configured to cover an outer periphery of the case when mounted to an outside of the case, the chassis cover comprising:
a cover body configured to be mounted to the case, wherein the cover body is configured to cover the bezel and the top sidewall in a state in which the chassis cover is mounted to the case;

a magnetic body provided in a portion of the cover body which covers the top sidewall, the magnetic body being configured to detachably mount the chassis cover to the case by a magnetic force between the case and the magnetic body; and a support rib protruding from the cover body, wherein the support rib comprises:

a front support rib protruding inwardly from a portion of the cover body which covers the bezel toward the case, covering an end of the bezel opposite to the top sidewall, and spaced apart from the end of the bezel opposite to the top sidewall, in the state in which the chassis cover is mounted to the case; and a rear support rib protruding from a portion of the cover body which covers the top sidewall toward the case and covering a rear end of the top sidewall, in the state in which the chassis cover is mounted to the case.

* * * * *